(12) United States Patent
Michael

(10) Patent No.: US 10,789,649 B2
(45) Date of Patent: Sep. 29, 2020

(54) METHOD AND APPARATUS OF GOALS-BASED INVESTING USING A BLENDED ACCOUNT-LEVEL TARGET

(71) Applicant: Smartleaf, Inc., Cambridge, MA (US)

(72) Inventor: Gerard Michael, Cambridge, MA (US)

(73) Assignee: SMARTLEAF, INC., Boston, MA (US)

( * ) Notice: Subject to any disclaimer, the term of this patent is extended or adjusted under 35 U.S.C. 154(b) by 545 days.

(21) Appl. No.: 14/620,179

(22) Filed: Feb. 11, 2015

(65) Prior Publication Data

US 2015/0228026 A1    Aug. 13, 2015

Related U.S. Application Data

(60) Provisional application No. 61/938,676, filed on Feb. 11, 2014.

(51) Int. Cl.
*G06F 40/00* (2020.01)
*G06Q 40/06* (2012.01)

(52) U.S. Cl.
CPC ................. *G06Q 40/06* (2013.01)

(58) Field of Classification Search
None
See application file for complete search history.

(56) References Cited

U.S. PATENT DOCUMENTS

| | | | |
|---|---|---|---|
| 2002/0111890 A1* | 8/2002 | Sloan | G06Q 40/00 705/36 R |
| 2005/0010516 A1* | 1/2005 | Ivanov | G06Q 40/06 705/36 R |
| 2012/0323816 A1* | 12/2012 | Clouse | G06Q 40/06 705/36 R |
| 2013/0018818 A1* | 1/2013 | Yadav | G06Q 40/06 705/36 R |

* cited by examiner

*Primary Examiner* — Scott S Trotter
(74) *Attorney, Agent, or Firm* — HIPLegal LLP; Judith Szepesi

(57) ABSTRACT

A method and apparatus of a device that performs goals-based investing using an account-level target is described. In one embodiment, the device processes data representing a plurality of goals of an investor, an investment style for each goal, an account for funding the goals, and initial funding levels for each goal to create a goal-level target for each goal. The device creates an account-level target based on the goal-level targets and an initial blend ratio that is formed from the initial funding levels. The device manages a purchased portfolio of the investor using the account-level target. The device allocates funds of the purchased portfolio to the goals such that the allocated funds update the funding levels for each goal. In a further embodiment, the device updates the account-level target based on an updated blend ratio, where the updated blend ratio is formed from the updated funding levels for each goal.

20 Claims, 9 Drawing Sheets

METHOD AND APPARATUS OF GOALS-BASED INVESTING USING A BLENDED ACCOUNT-LEVEL TARGET

RELATED APPLICATIONS

Applicant claims the benefit of priority of prior, co-pending provisional application Ser. No. 61/938,676, filed Feb. 11, 2014, which is incorporated by reference.

FIELD OF INVENTION

This invention relates generally to investment portfolio management and more particularly to performing computer-implemented goals-based investing (GBI) using an account-level target.

BACKGROUND OF THE INVENTION

Computer-implemented Goals-based investing (GBI) describes an approach to wealth management where investment choices are guided by a desire to meet one or more financial goals. In this situation, computers or computer systems are used to perform GBI to enable investors to achieve their goals. Examples of goals include: withdraw $100,000 every year at retirement at age 70 until death; withdraw $50,000 each year for four years for kids' college in 10 years; bequeath $1,000,000 to heirs; buy a boat for $100,000 in four years; or build a "rainy day fund" of $100,000 in five years. Each of these goals describes a desired accumulation of assets and/or ability to support a specified stream of expenditures over time. For convenience, it is common to refer to goals as being in the simple form of accumulating a particular dollar value at a set point in time, e.g. "$1 million in 30 years."

The aim of goals-based investors and their advisors is to maximize the probability of meeting the investor's goals, in order of their priority. Notably, this is not the same as simply maximizing expected returns. For example, suppose an investor starts with $1 million and has a goal of having $1.5 million in 10 years. This goal can be achieved with near certainty by simply investing in 10-year Treasury bonds, assuming interest rates above 4.2%/year; this is then the investment with highest probability of success, though it is not the investment with the highest expected returns.

GBI can be contrasted with a risk-based approach to wealth management. In a risk based approach, investors are not asked about their goals, but about their risk tolerance, e.g. "Aggressive, Conservative, Growth and Income". Riskier portfolios have higher expected (average) returns, but are more vulnerable to large drops in value. Investors and their advisors seek to construct portfolios with the highest expected return for a given level of risk. Such portfolios are said to be on the "efficient frontier" of the trade-off between risk and return.

The traditional way to implement GBI is to divide an investor's holdings into subaccounts, one for each goal. Each of these subaccounts is a different investment account in which an asset is owned by that account and not shared with another subaccount. This structure is intuitive to many investors, but the division of an investors assets into subaccounts is operationally complex and interferes with managing the portfolio holistically, which can lead to excess risk, trading costs and/or taxes, and, most importantly, a lower probability of meeting goals.

This operational complexity is inextricably tied to the field of computer technology, where computers and/or computer systems are used to perform the traditional subaccount approach to GBI for many investors. In particular, errors can result from the computerized implementation and processing of the complex investments choices that have to be made by an investor or his advisors from the limited options available to the investor. Furthermore, as the number of subaccounts and the corresponding restrictions on the number and/or types of securities that can be purchased for each subaccount increase, the likelihood of the occurrence errors can also increase, which can make the rectification of the errors increasingly difficult. This issue can be particularly prevalent in the field of computer-implemented GBI.

Additionally, the operational complexity associated with the manipulation of the data that represents investors, investor goals, subaccounts, investor funds/assets, and investor portfolios could increase as the size and/or complexity of the errors described above increases. This is because rectification of the errors caused by the traditional subaccount approach to GBI can require deployment of additional computer resources. This in turn could place additional, unexpected workloads on a computer processing unit (CPU) of a device, a computer network, or a computing system that is executing instructions to implement this traditional approach. In computer systems used for GBI, using the traditional subaccount approach could require increasing amounts of CPU processing time, memory, network bandwidth, data bandwidth, or a combination thereof to rectify errors to the data that represents investors' goals, subaccounts, and/or portfolios as that data becomes larger and/or more diverse.

SUMMARY OF THE DESCRIPTION

A method and apparatus of a device that performs goals-based investing using an account-level target is described. In one exemplary embodiment, the device processes data representing a plurality of goals of an investor, an investment style for each of the plurality of goals, an account for funding the plurality of goals, and initial funding levels for each of the plurality of goals to create a goal-level target for each of the plurality of goals. The device creates an account-level target based on the goal-level targets and an initial blend ratio, the initial blend ratio being formed from the initial funding levels. The device also manages a purchased portfolio of the investor using the account-level target. In addition, the device allocates funds of the purchased portfolio to the plurality of goals such that the allocated funds are used to update funding levels for each goal. In a further embodiment, the device updates the account-level target based on an updated blend ratio, where the updated blend ratio is formed from the updated funding levels for each goal.

In another exemplary embodiment, the device performs goals-based investing for an investor that has more than one account by setting up an account-level target for each account, maintaining the account-level target of each account, and adjusting the account-level targets of each account, as needed.

Other methods and apparatuses are also described.

BRIEF DESCRIPTION OF THE DRAWINGS

The present invention is illustrated by way of example and not limitation in the figures of the accompanying drawings in which like references indicate similar elements.

DETAILED DESCRIPTION

Figure 1:
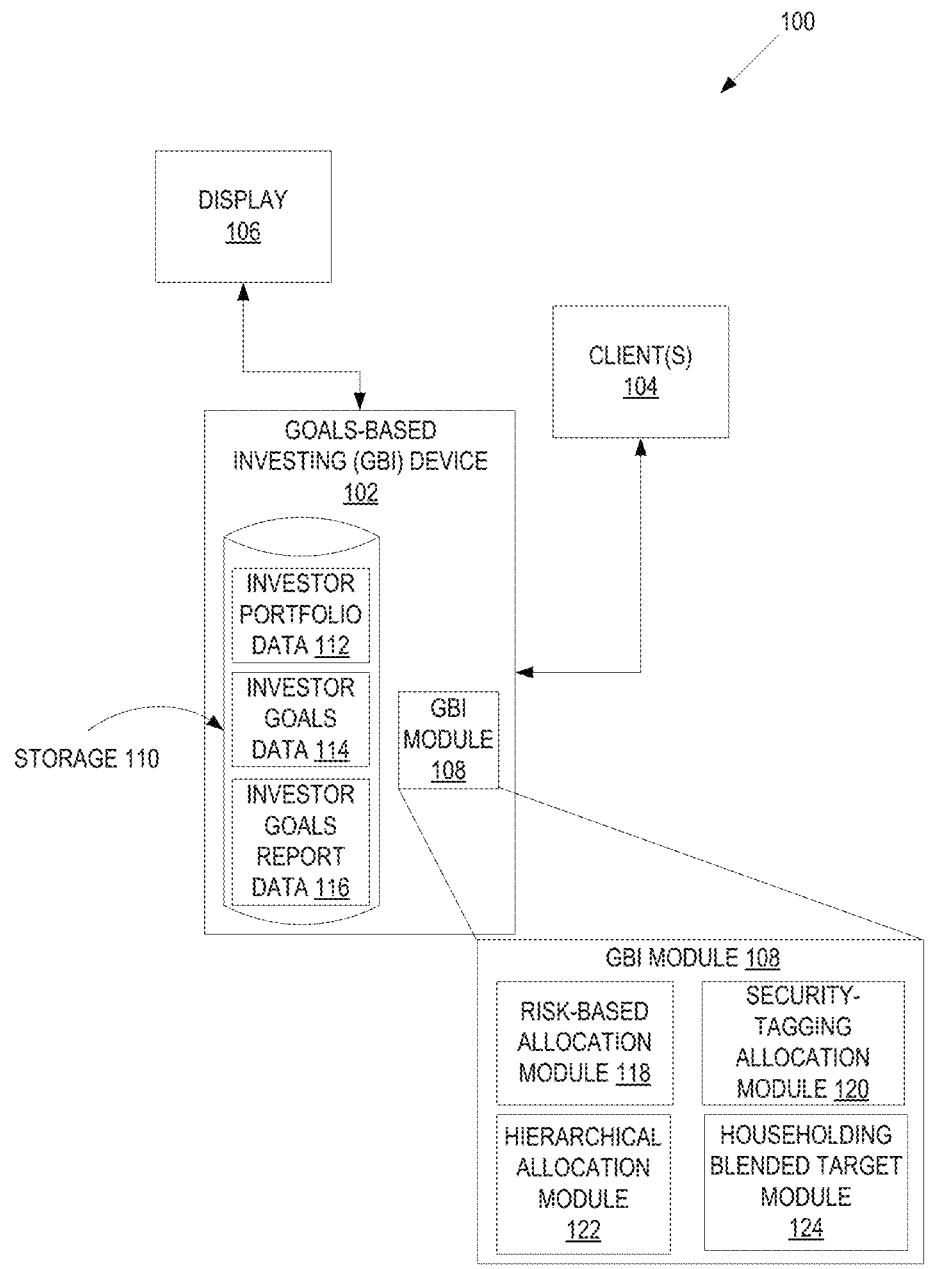
FIG. 1 is a block diagram of one embodiment of a system to perform goals-based investing (GBI) with an account-level target.

A method and apparatus of a device that performs goals-based investing (GBI) using an account-level target is described. In the following description, numerous specific details are set forth to provide thorough explanation of embodiments of the present invention. It will be apparent, however, to one skilled in the art, that embodiments of the present invention may be practiced without these specific details. In other instances, well-known components, structures, and techniques have not been shown in detail in order not to obscure the understanding of this description.

Reference in the specification to "one embodiment" or "an embodiment" means that a particular feature, structure, or characteristic described in connection with the embodiment can be included in at least one embodiment of the invention. The appearances of the phrase "in one embodiment" in various places in the specification do not necessarily all refer to the same embodiment.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The processes depicted in the figures that follow, are performed by processing logic that comprises hardware (e.g., circuitry, dedicated logic, etc.), software (such as is run on a general-purpose computer system or a dedicated machine), or a combination of both. Although the processes are described below in terms of some sequential operations, it should be appreciated that some of the operations described may be performed in different order. Moreover, some operations may be performed in parallel rather than sequentially.

The terms "server," "client," and "device" are intended to refer generally to data processing systems rather than specifically to a particular form factor for the server, client, and/or device.

The traditional way to implement goals-based investing (GBI) is to divide an investor's holdings into subaccounts, one for each goal. Each of these subaccounts is a different investment account in which one or more assets are owned by that account and not shared with another subaccount. For example and in one embodiment, one or more securities that are owned by an investor are assigned to a first subaccount for achieving a first goal of the investor and changes of the assignment to a second subaccount occur only upon an explicit transfer of the one or more securities. In this example, the second subaccount is set up to achieve a second goal of the investor that is different from the first goal.

Implementation of the traditional subaccount approach requires that investors or their advisors: create a subaccount for each goal; decide how much funds to put in each subaccount; decide how to invest the funds in each goal (e.g., implicitly, this funding level determines a prioritization among the investor's goals); and periodically, investors or their advisors may choose to transfer funds or securities from one subaccount to another.

Based on a set of assumptions regarding the risk and return of different securities, investors and their advisors that use the traditional subaccount approach to GBI can estimate the probability of meeting each goal. This probability can be adjusted by changing the goal; reallocating the funding level of each goal; or changing the level of planned savings.

Typically, in the traditional subaccount approach, investors or their advisors will create a "trend line" for each goal to show the planned value of each subaccount over time. Investors can evaluate their progress by comparing the value of each goal's subaccount with that goal's trend line. This gives investors a simple way to visualize whether they are on track.

The traditional subaccount approach to GBI is intuitive to many investors and their advisors, however the division of an investor's assets into subaccounts is operationally complex. This operational complexity is inextricably tied to the field of computer technology, where computers and/or computer systems are used to perform the traditional subaccount approach to GBI for many investors. In particular, errors can result from the computerized implementation and processing of the complex investments choices that have to be made by an investor or his advisors from the limited options available to the investor. For example, if an investor implementing the traditional subaccounts approach has multiple subaccounts, one of which is a small-sized subaccount (say $10,000) with a constraint on the number of securities that can be purchased for the subaccount (say 100 stocks from multiple sources), then this subaccount could be prone to many errors. In this example, one possible error could result from restrictions that prevent investors from owning fractional shares (e.g., less than one), if the small-sized subaccount includes a fractional share, this error could affect the constraint requiring that only 100 stocks exist within the subaccount. Furthermore, as the number of subaccounts and the corresponding restrictions on the number and/or type of securities that can be purchased for each subaccount increase, the likelihood of the occurrence errors can also increase, which can make the rectification of the errors increasingly difficult. This issue can be particularly prevalent in the field of computer-implemented GBI.

Additionally, the operational complexity associated with the manipulation of the data that represents investors, investor goals, subaccounts, investor funds/assets, and investor portfolios could increase as the size and/or complexity of the errors described above increases. This is because rectification of the errors caused by the traditional subaccount approach to GBI can require deployment of additional computer resources. This in turn could place additional, unexpected workloads on a computer processing unit (CPU) of a device, a computer network, or a computing system that is executing instructions to implement this traditional approach. In computer systems used for GBI, using the traditional subaccount approach could require increasing amounts of CPU processing time, memory, network bandwidth, data bandwidth, or a combination thereof to rectify errors to the data that represents investors' goals, subaccounts, and/or portfolios as that data becomes larger and/or more diverse.

Embodiments described herein perform GBI using an account-level target. These embodiments can assist with reducing the operational complexity associated with the traditional subaccounts approach to GBI by reducing the likelihood of errors that exist in the traditional approach, which in turn can enable one or more CPUs of the computers or computer systems executing instructions to perform GBI using an account-level target to become more efficient by reducing the need for deploying additional computer resources to resolve those errors. Furthermore, the embodiments described herein can assist with reducing the operational complexity by holistically managing one or more portfolios of an investor with the account-level target. The inability of the traditional subaccounts approach to consider how the investor's assets, when viewed collectively, can be used to achieve the investor's goals can lead to excess risk, trading costs, and/or taxes; slow reactions to unexpected changes in an investor's assets or liabilities; and most importantly, a lower probability of meeting the investor's goals. In contrast, the embodiments described herein, which perform GBI with an account-level target can assist with reducing the disadvantages associated with the traditional approach.

The embodiments described herein can also assist with reducing the operational complexity that can occur when subaccounts are used in "householding" situations. As used herein, "householding" refers to GBI that includes the management of multiple accounts belonging to a single investor. A single investor can be an individual, a group of individuals with at least one correlating characteristic (such as a family or employees of the same company, or other groups), and/or a non-natural entity (such as a business association).

Embodiments described herein include a method and apparatus of a specialized GBI device that performs GBI using an account-level target. In one embodiment, the performance of GBI using an account-level target can be at least one of a single account GBI approach using an account-level target or a householding GBI approach using at least two account-level targets. In one embodiment, the specialized GBI device performs GBI that combines a holistic approach to GBI with one or more advantages of the traditional subaccounts approach, without one or more disadvantages of the traditional subaccounts approach.

By using this specialized GBI device in a computer or a computer system, investors and/or their advisors can implement an operationally efficient management of GBI using an account-level target. The specialized GBI device assists with performance of GBI without using subaccounts. The specialized GBI device also includes a holistic investing approach that can assist with the allocation of the total value of a portfolio among the goals of an investor. Furthermore, the specialized GBI device can offer greater operational simplicity, and faster time-to-market at a lower cost. The specialized GBI device introduces one or more components (e.g., one or more account-level targets, etc.) that are not well-understood, routine, or conventional to the field of computer-implemented GBI which can provide an operationally efficient management of GBI that reduces the likelihood of errors in GBI.

In one embodiment, the specialized GBI device performs a single account GBI approach using an account-level target, as described below. In one embodiment, the specialized GBI device performs a householding GBI approach using at least two account-level targets, as described below.

FIG. 1 is a block diagram of one embodiment of a system 100 to perform GBI without using subaccounts. The illustrated embodiment of system 100 can perform at least two forms of GBI: (i) a single account GBI approach using an account-level target; or (ii) a householding GBI approach using at least two account-level targets. With regard to system 100, a single account GBI approach using an account-level target ("single account GBI approach") is described before a householding GBI approach using at least two account-level targets ("householding GBI approach") is described.

In FIG. 1, the system 100 includes a specialized GBI device 102, client(s) 104, and display 106. In one embodiment, the specialized GBI device 102 is a specialized device that performs GBI, without using the traditional subaccounts approach to GBI. In one embodiment, the specialized GBI device 102 is included in a personal computer, laptop, server, mobile device (e.g., smartphone, laptop, personal digital assistant, music playing device, gaming device, etc.), and/or any device capable of executing a computer-implemented process. In one embodiment, the GBI device 102 can be a physical or virtual device. In one embodiment, the specialized GBI device 102 is included in a computer or a computer system that manipulates data to perform GBI. In one embodiment, the specialized GBI device 102 includes a GBI module 108 and storage 110.

In one embodiment, the GBI module 108 performs at least one of the single account GBI approach or the householding GBI approach for an investor based on data representing one or more portfolios of the investor. In one embodiment, a portfolio is a collection of securities, where a security can be any type of financial investment (e.g., stocks, bonds, options, unit trust, foreign currency, real estate investment trust, and/or other types of funds (e.g., money market fund, hedge fund, or another type of fund)). In this embodiment, an investor portfolio is a collection of securities that is owned by the investor. An investor may have one or more portfolios.

In one embodiment, the GBI module 108 begins performing a single account GBI approach by receiving data representing one or more goals of an investor from at least one of storage 110 or client(s) 104. For example and in one embodiment of the single account GBI approach, the GBI module 108 receives input data representing one or more goals 114 of the investor from at least one of client(s) 104 or storage 110. In one embodiment of the single account GBI approach, the input data representing one or more goals of the investor is included in investor goals data 114, which is stored in storage 110. Storage 110 is described below. In one embodiment of the single account GBI approach, the GBI module 108 is in communication with a financial planning system (not shown) via one or more clients 104. In one embodiment, the data representing the goals of the investor is stored in the financial planning system and provided to the GBI module 108 via one or more clients 104.

In one embodiment of the single account GBI approach, the GBI module 108 receives data representing an investment style for achieving the each of the goals of the investor. In one embodiment, each investment style determines the type of portfolio to be created for achieving each corresponding goal of the investor. In one embodiment of the single account GBI approach, the investment style is based on a risk-based approach to wealth management. In one embodiment of the single account GBI approach, the investment style is based on the investor's risk tolerance for each portfolio that will be used to achieve each of the investor's goals. In one embodiment of the single account GBI approach, each portfolio that is associated with each goal may be assigned a different risk tolerance. For example and in one embodiment of the single account GBI approach, a goal of achieving $10 million in 10 years can be assigned an "Aggressive" investment style, a goal of funding a college fund can be assigned a "Conservative" investment style, a goal of purchasing a home can be assigned a "Growth" investment style, while a goal of creating donating $10,000 can be assigned an "Income" investment style. The investment style can also be based on how much risk is associated with a collection of securities to be used for achieving a particular goal. For one embodiment of the single account GBI approach, a risk can be a measure of how risky that portfolio is, such as low risk (which provides a low level of expected return), medium risk (which provides a medium level of expected return), or high risk (which provides a high level of expected return). In one embodiment of the single account GBI approach, risk is represented as the value beta (correlation to the return of the market as a whole). In one embodiment of the single account GBI approach, the data representing the investment styles is provided to GBI module 108 from at least one of storage 110 or client(s) 104. In one embodiment of the single account GBI approach, the data representing the investment style for a goal is included in investor portfolio data 112, which is stored in storage 110. In one embodiment of the single account GBI approach, the GBI module 108 is in communication with a financial planning system (not shown) via one or more clients 104. In one embodiment of the single account GBI approach, the data representing the investment styles is stored in the financial planning system and provided to the GBI module 108 via one or more clients 104.

In one embodiment of the single account GBI approach, the GBI module 108 receives data representing the investor's account. As used herein, an "account" and its variations refer to the source of the funds that will be used by the investor to perform the GBI, e.g., a 401(k) account that will be used to achieve a specific goal. In one embodiment of the single account approach, the GBI module 108 receives the data representing the investor's account from at least one of client(s) 104 or storage 110. In one embodiment of the single account GBI approach, the data representing the investor's account is included in investor goals report data 116, which is stored in storage 110. In one embodiment of the single account GBI approach, the GBI module 108 is in communication with a financial planning system (not shown) via one or more clients 104. In one embodiment, the data representing the investor's account is stored in the financial planning system and provided to the GBI module 108 via one or more clients 104.

In one embodiment of the single account GBI approach, the GBI module 102 also receives data representing a funding level for each of the investor's goals. As used herein, a "funding level" and its variations refer to an amount of funds from the investor's account that will be used as the investment for achieving a particular goal. In one embodiment of the single account GBI approach, the data representing the funding level for each goal is an initial funding level to be used for achieving the corresponding goal. In one embodiment of the single account GBI approach, the GBI module 108 receives the data representing the initial funding level for each corresponding goal of the investor from at least one of client(s) 104 or storage 110. In one embodiment of the single account GBI approach, the data representing the initial funding levels is included in investor goals report data 116, which is stored in storage 110. In one embodiment of the single account GBI approach, the GBI module 108 is in communication with a financial planning system (not shown) via one or more clients 104. In one embodiment of the single account GBI approach, the data representing the initial funding levels is stored in the financial planning system and provided to the GBI module 108 via one or more clients 104. In one embodiment, the initial funding levels for each goal is input data that is manually provided by the investor or his advisor and stored in the storage 110 or the financial planning system (not shown). In one embodiment, the initial funding levels for each goal is determined, without any user inputs, based on one or more financial planning algorithms that are stored in storage 110 or a financial planning system. As described below, in one embodiment of the single account GBI approach, these initial funding levels will be automatically modified following an application of an allocation algorithm by the GBI module 108 or following the GBI module 108 receiving one or more inputs provided by the investor or his advisor.

In one embodiment of the single account GBI approach, the GBI module 108 processes the data representing the investor's goals, the corresponding investment styles, and the corresponding initial funding levels to determine a goal-level target for each of the investor's goals. As used herein, a "goal-level target" and its variations refer to an idealized weighted portfolio that can be used to achieve a particular goal of the investor. In other words, a goal-level target is a specific implementation of an investment style, e.g., an idealized combination of different types of securities that will be used to achieve a goal as determined by the investment style.

As used herein, an "idealized weighted portfolio" is a plurality of securities that an investor would buy if, at that moment, the funding levels were immediately available as cash, without restrictions on the number and/or types of securities that can be purchased. An idealized weighted portfolio is expressed in terms of the relative weights of the securities that make up the portfolio. For example and in one embodiment of the single account GBI approach, an idealized weighted portfolio is made up of 50% equity securities and 20% debt securities (e.g., bonds). In one embodiment of the single account GBI approach, the idealized weighted portfolio can be further refined to be made up of securities from a particular source. For example and in one embodiment of the single account GBI approach, the idealized weighted portfolio is made up of 45% securities obtained from Vanguard® exchange traded funds (ETFs) and 55% securities obtained from Fidelity Investments® low-priced stock fund.

In one embodiment of the single account GBI approach, the GBI module 108 receives the data representing the collection of securities from at least one of client(s) 104 or storage 110. In one embodiment of the single account GBI approach, the data representing the collection of securities is included as part of investor portfolio data 112, which is stored in storage 110. In one embodiment of the single account GBI approach, the GBI module 108 is in communication with a financial planning system (not shown) via one or more clients 104. In one embodiment of the single account GBI approach, the data representing the collection of securities is stored in the financial planning system and provided to the GBI module 108 via one or more clients 104. In one embodiment of the single account GBI approach, the GBI module 108 uses the data representing the collection of securities to process the data representing the investor's goals, the corresponding investment styles, and the corresponding initial funding levels. In one embodiment of the single account GBI approach, the result of the processing is a determination of a goal-level target for each of the investor's goals. For example and in one embodiment of the single account GBI approach, a retirement goal is assigned a goal-level target comprised of only equity securities, a college fund goal is assigned a goal-level target comprised of only debt securities (e.g., bonds, etc.), and a vacation house goal is assigned a goal-level target comprised of 50% equity securities and 50% debt securities.

In one embodiment of the single account GBI approach, the data received from client(s) 104 or stored on storage 110 that is used to determine the goal-level target is provided via input devices being used by the investors or their advisors. In this embodiment of the single account GBI approach, the data includes data representing the investor's goals, investment styles, funds, initial funding levels, and collection of securities. In one embodiment of the single account GBI approach, the data received from client(s) 104 or stored on storage 110 that is used to determine the goal-level target is provided automatically, without any inputs from the investor or his advisor. In this embodiment of the single account GBI approach, if the data is received from client(s) 104, then the data is retrieved from a server or database that is part of a financial planning system (not shown) that includes data representing the investor's goals, investment styles, funds, initial funding levels, and collection of securities.

In one embodiment of the single account GBI approach, the GBI module 108 creates an account-level target for the investor's goals based on the goals' goal-level targets. As used herein, "an account-level target" and its variations refer to an idealized portfolio that can be used to guide management of an investor's actual portfolio that is being used by the investor to achieve the investor's goals, e.g., an idealized portfolio that can be used to achieve an investor's goals that are being funded from a single account, wherein the investor is performing GBI with the single account. In one embodiment, the account-level target is created by blending the goal-level targets of the investor's goals together using a blending algorithm that proportionally factors in the initial funding level of each goal to create the account-level target for the investor's goals as a whole. The proportional weighting of initial funding levels to create the account-level target for the investor's goals is referred to herein as an "initial blend ratio." In this way, the account-level target can be seen as a master target for the investor's goals. The account-level target (as determined based on the updated blend ratio) would be used to guide the management of the investor's single account holistically, without subaccounts, in a way that allows for further modifications based on customization, constraints and/or preferences, tax management, etc. For one embodiment, the blending algorithm is stored in GBI module 108. In one embodiment, the blending algorithm is provided to GBI module 108 from a financial planning system, via one or more clients 104.

One advantage of the account-level target is that it can be used as a guide for the actual portfolio that is purchased by the investor to achieve his goals (hereinafter "actual portfolio"). In other words, the investor can have his actual portfolio mirror the account-level target as closely as possible, while taking into account one or more constraints and/or preferences. As used herein, "constraints and/or preferences" and its variations refer to one or more conditions or preferences imposed by the investor for determining one or more securities to be used for achieving the investor's goals. These constraints and/or preferences can include, without limitation, at least one of an exclusion of a type of security; an imposition for a security to be purchased; a limit on turnover (the amount of trading); a limit on total tax obligation; a preference to avoid realizing a particular type of cost (e.g., taxes or trading costs); a limit on the expected yield of the portfolio (dividends plus interest); or a limit to the amount of a type of security that may be purchased. For example and in one embodiment, the investor may require that their IBM stock never be sold, stocks in tobacco companies never be purchased, no more than 20% of their portfolio be invested in bonds, no more than 10% of any portfolio be invested in foreign securities, taxes on realized gains for the year not exceed $10,000, application of a cost-benefit analysis to trading costs and realized gains, or that the portfolio is to invest in only a limited group of securities (e.g., those stocks that are part of the S&P 500). In one embodiment of the single account GBI approach, one or more constraints and/or preferences are included as part of investor portfolio data 112. In one embodiment of the single account GBI approach, one or more constraints and/or preferences are provided to GBI device from a financial planning system, via client(s) 102.

In one embodiment of the single account GBI approach, the account-level target can be updated based on at least one of: (i) the total value of the actual portfolio after a predetermined amount of time has elapsed; (ii) the change in the value of the actual portfolio in the investor's account after a predetermined amount of time has elapsed; (iii) the expected risk-return characteristic for each investment style of each goal; (iv) the trend line of each goal; (v) the value of securities that have been tagged to achieving each goal; or (vi) the amount of time that has elapsed (without any changes to the value of the actual portfolio and/or the value of the funds in the investor's account). Additional details about this embodiment of the single account GBI approach are described below.

In one embodiment of the single account GBI approach, after a predetermined period of time has elapsed, an allocation algorithm is used to allocate the funding levels of each goal. In one embodiment of the single account GBI approach, the results of the allocation algorithm are used to determine an updated funding level for each of the goals based, in part, on the total value of the actual portfolio at the time after the predetermined amount of time has elapsed.

In one embodiment of the single account GBI approach, the GBI module 108 uses the updated funding levels to update the account-level target. In one embodiment of the single account GBI approach, the account-level target is updated by blending the goal-level targets together using the blending algorithm that proportionally factors in the updated funding level of each goal (as determined by the allocation algorithm) to create an updated account-level target for the investor's single account and the investor's goals as a whole. The proportional weighting of updated funding levels to create the updated account-level target for the investor's single account and the goals is referred to herein as an "updated blend ratio." In this way, the updated account-level target can be seen as an updated master target for the investor's goals. The updated account-level target (as determined based on the updated blend ratio) would be used to guide the management of the investor's single account holistically, without subaccounts, in a way that allows for further modifications based on customization, constraints and/or preferences, tax management, etc. In one embodiment of the single account GBI approach, the updated funding levels for each goal that were determined by the allocation algorithm are used to create a report, which can be compared to a trend line for each goal. In this way, the investor can compare the updated funding levels for each of his goals at the time after the predetermined time period to the trend line for the corresponding goals. In this way, the investor or his advisor can track the progress of GBI, and make adjustments to his actual portfolio if necessary. In one embodiment of the single account GBI approach, an investor or his advisor can manually alter the funding levels of a goal at any time to make adjustments (e.g., before the allocation algorithm generates updated funding levels, after reviewing the report that is generated based on the updated funding levels, etc.). This manual alteration updates the blend ratio of the account-level target, as described above. In one embodiment of the single account GBI approach, the blend ratio can be updated nearly continuously upon receipt of new data, including but not limited to portfolio valuation, goals, goal targets, goal funding levels, and passage of time.

In one embodiment of the single account GBI approach, the allocation algorithm is stored in GBI module 108. In one embodiment of the single account GBI approach, the allocation algorithm is provided to GBI module 108 from client(s) 104. In one embodiment, the allocation algorithm is based on the total value of the actual portfolio of the investor after the predetermined time period has elapsed and at least one of: (i) the risk-return characteristics of the investment style of each goal; (ii) a change in the value of the actual portfolio; (iii) a hierarchy of goals determined based on the relative priority of each goal to the investor and a trend line of each goal; (iv) a current trend line value of each goal; or (iv) a security-level tagging algorithm, which is based the value and types of securities in the actual portfolio, the value and types of securities in each of the goal-level targets, and the initial blend ratio. Those of ordinary skill in the art will appreciate that the allocation algorithm can be modified based on any number of factors that can affect investing, as is known in the art, e.g., one or more U.S. Federal Securities laws, one or more U.S. tax laws, one or more constraints and/or preferences, etc.

As explained above, the investor can have his actual portfolio mirror the idealized weighted portfolio in the account-level target as closely as possible, while taking into account one or more constraints and/or preferences. In one embodiment of the single account GBI approach, the actual portfolio may be rebalanced based on the updated account-level target, as determined by the updated funding levels. In this way, the actual portfolio can be managed holistically—with a reduced likelihood of errors—based on the updated account-level target.

In one embodiment, the GBI device 102 includes storage 110. In one embodiment, the storage 110 is persistent storage that stores the data used to perform GBI and the results of the GBI. In one embodiment, storage 110 is memory that temporarily stores the data and results of GBI. In one embodiment, the storage 110 stores investor portfolio data 112, investor goals data 114, and investor goals report data 116.

In one embodiment, each of clients 104 is a piece of computer hardware or software that accesses data available on a server (not shown) or a computer system (not shown). In one embodiment, the client 104 accesses the data on the server or computer system by way of a network and provides the data to GBI device 102, as is known in the art. For example and in one embodiment, the network is at least one of a LAN (local area network), a virtual local area network (VLAN), a WAN (wide area network), a computer network that uses Hypertext Transfer Protocol (HTTP) or any other computer network as is known in the art.

In one embodiment, the investor goals data 114 includes data that describes each of the investor goals. In one embodiment, each of these goals describes a desired accumulation of assets and/or flow of funds over time (e.g. "$1 million in 30 years"). For example and in one embodiment, a goal can be withdraw $100,000 every year at retirement at age 70 until death; withdraw 50,000/year for four years for kids' college in 10 years; bequeath $1,000,000 to heirs; buy a boat for $100,000 in four years; or build a "rainy day fund" of $100,000 in five years. An investor may have one or more goals that he uses GBI to achieve. In one embodiment, an investor could be investing to achieve two or more concurrent goals. For example and in one embodiment, saving $1,000,000 for retirement in 25 years and saving $50,000 for a boat in five years.

In one embodiment, the investor report data 116 is reporting data that illustrates the funding levels of the goals and can further include analysis on the state of each goal. In this embodiment, each of the investor goals is evaluated using at least one of the techniques described below in FIG. 2, 4, 5, or 6. In one embodiment, the investor's portfolio is periodically analyzed to determine the funding levels of each of the goals.

In one embodiment of system 100, the specialized GBI device 102 performs a householding GBI approach using at least two account-level targets. In a householding GBI approach, at least two account-level targets are created for each of a single investor's multiple accounts. In one embodiment, the householding GBI approach is a modification of the single account approach using an account-level target. In one embodiment, the differences between the two forms of GBI are described in connection with the householding GBI approach.

Some differences between the single account approach and the householding approach are that: (i) the householding approach includes multiple accounts that are being used for GBI; (ii) an account-level target is created for each of the multiple accounts that is being used for GBI; and (iii) funding level for any goal can come from one or more of these multiple accounts. For example and in one embodiment of the householding GBI approach, for each account, the blend ratio is based on the funding level of each goal in that account, which would cause the blend ratio to differ from account to account based on which accounts are used to fund each goal. Selecting which account(s) in a household will be used to fund each goal can provide a better strategy for GBI because it can be used to reduce tax costs, avoid penalties for withdrawing funds from a particular account, obey time limits on how long a particular asset/security in an account should be held, etc. In one embodiment, the selection of the accounts is performed manually by the investor and/or his advisor. In one embodiment, the selection is performed automatically based data analyzed by a financial planning system.

In one embodiment of the householding GBI approach, the GBI module 108 receives data representing the investor's goals, the corresponding investment styles for each goal, the investor's multiple accounts, and the corresponding funding levels for each goal from each account. In one embodiment, the data representing the investor's goals, the corresponding investment styles for each goal, the investor's multiple accounts, and the corresponding funding levels for each goal from each account is received by the GBI module 108 from at least one of storage 110 or client(s) 104, as described above in connection with description of the single account approach. In one embodiment of the householding GBI approach, for each account, the GBI module 108 receives data representing the funding levels for each goal that is funded by that account.

In one embodiment of the householding GBI approach, the GBI module 108 processes the data representing the investor's goals, the corresponding investment styles, the corresponding funding levels for each goal in each of the multiple accounts to determine a goal-level target for each of the investor goal's in each of the multiple accounts. In other words, each account includes a goal-level target for each goal that is funded by that account.

In one embodiment of the householding GBI approach, for each account, each of the goal-level targets included in the account are blended, in proportion to the funding level of each goal in the account, to create an account-level blended target. Furthermore and in this embodiment, these goal-level targets are created as described above in connection with the single account GBI approach with the modification being that the data representing each account's contribution to each of the goals' funding levels is also considered. In one embodiment of the householding GBI approach, each of the account-level targets of each of the investor's accounts are monitored and updated after the application of one or more allocation algorithms is used to update the funding levels for each goal in each account. Allocation algorithms are described above in connection with single account approach. In one embodiment, the allocation algorithm is applied to the account-level target for each account and is used to update the finding levels of each goal for each account.

In one embodiment, the GBI module 108 includes risk-based allocation module 118, security-tagging allocation module 120, hierarchical allocation module 122, and householding blended target module 124. In one embodiment, the risk-based allocation module 118 performs a single account approach to GBI using a blended target as described below in connection with FIG. 2. In the embodiment described below in connection with FIG. 2, the risk-based allocation module 118 allocates the funding levels to each goal using one or more risk-return characteristics associated with the investment styles of each goal. In one embodiment, the security-tagging allocation module 120 allocates funding among the goals and updates the blend ratio of the blended target based on portfolio tagging data, as described below in connection with FIG. 4. In one embodiment, the hierarchical allocation module 122 allocates funding among the goals and updates the blend ratio of the blended target based in part on the relative importance of the goals to the investor, as described below in connection with FIG. 5. In one embodiment, the householding blended target module 124 performs a householding GBI approach and allocates the funds using at least one of the allocation algorithms described above in connection with FIG. 1.

Figure 2:
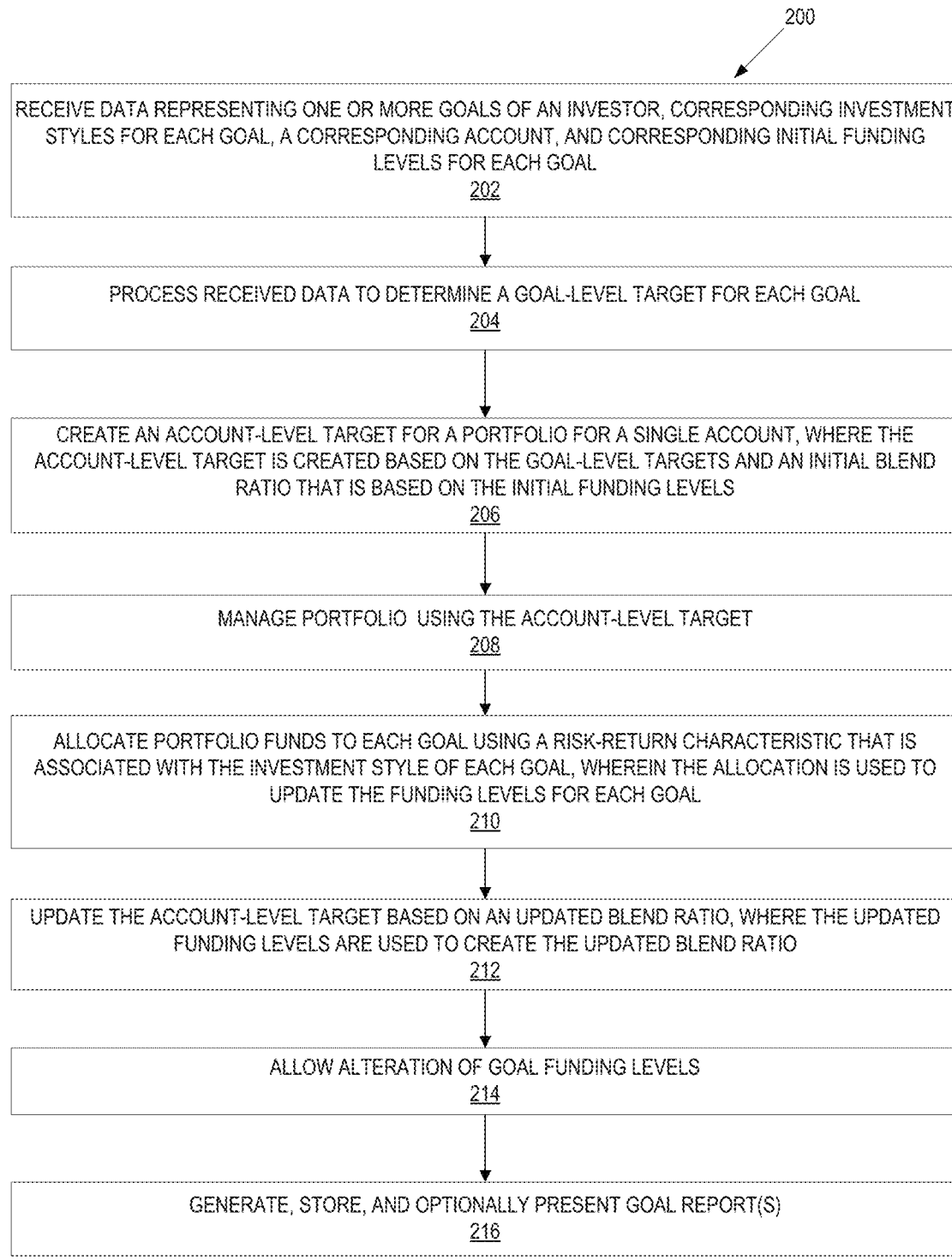
FIG. 2 is a flowchart of one embodiment of a process to perform GBI using an account-level target and an algorithm that allocates portfolio value among the goals proportionate to the risk level of each goal's assigned investment style.

FIG. 2 is a flowchart of one embodiment of a process 200 to perform a single account approach of GBI using a blended target. In one embodiment, process 200 is performed by a blended target module, such as the risk-based allocation module 118 of GBI module 108 that is described above in connection with FIG. 1. In FIG. 2, process 200 begins by receiving data representing one or more goals of an investor, corresponding investment styles for each goal, a corresponding account, and corresponding initial funding levels for each goal at block 202. In one embodiment, the receiving of data representing one or more goals of an investor, corresponding investment styles for each goal, a corresponding account, and corresponding funding levels for each goal is performed as described above in FIG. 1. At block 204, process 200 processes the received data to determine a goal-level target for each goal. In one embodiment, the processing of the received data to determine a goal-level target for each goal is performed as described above in FIG. 1. Process 200 creates an account-level target for the investor's portfolio at block 206 using a blend ratio determined from the initial funding levels the goals determined in block 202. As explained above in connection with FIG. 1, in one embodiment, the initial funding levels for each goal is input data that is manually provided by the investor or his advisor and stored in the storage 110 or a financial planning system (not shown). In one embodiment, each of the initial funding levels for each goal is determined, without any user inputs, based on one or more financial planning algorithms that are stored in storage 110 or a financial planning system. In one embodiment, the initial funding levels are used by a blending algorithm as an initial blend ratio to create a blended target from the goals' goal-level targets, as described above in FIG. 1.

At block 208, process 200 manages the actual portfolio using the account-level target. For example and in one embodiment, process 200 manages the actual portfolio using a portfolio optimization program that enables the actual portfolio to mirror the account-level target as closely as possible, while taking constraints and/or preferences into account. By using an account-level target, the actual portfolio can be managed as a whole instead of having individual subaccounts that are managed separately. This allows for an overall management of the portfolio and avoids the likelihood of errors that may prevent the achievement of one or more of the investor's goals using this system. For example and in one embodiment, management of one subaccount may purchase one security and a management of another subaccount may sell that same security, even though both subaccounts belong to a single investor and the purchase of the security would facilitate achievement of one of the investor's goals. By managing the portfolio as a whole using an account-level target as described herein, such inconsistent management can be reduced, if not eliminated.

In one embodiment, process 200 allocates the actual portfolio's funds to each goal using the risk-return characteristic that is associated with the investment style of each goal at block 210. In one embodiment, process 200 performs this allocation using an allocation algorithm, such as the one described above in FIG. 1. In one embodiment, the allocation algorithm results in an allocation of the portfolio funds on a periodic time basis such that the investor would have an indication as to the funding level for each goal. In one embodiment, the allocation algorithm causes goals with riskier investment styles and/or goal-level targets to be allocated a larger percentage of the gains and losses and less risky investment styles and/or goal-level targets to be allocated a smaller percentage of the gains and losses. For example and in one embodiment, the allocation is made using Equation (1), which is represented with the following formula:

$$\text{Goal allocation}_i = [a_i \times P_0] + [(a_i \times P_0) \times ((1+r)^k - 1)] + \left[\frac{(b_i \times a_i)}{\sum_i (b_i \times a_i)}\right] \times [P_k - ((1+r)^k \times (a_i \times P_0))]$$

where:
goal i=goal$_1$, goal$_2$, goal$_3$ . . . goal$_i$
time k=time$_1$, time$_2$, time$_3$ . . . time$_k$
$a_1$, $a_2$, . . . $a_n$=the allocation in percentage each goal
$b_1$, $b_2$, . . . $b_n$=the beta for each goal's target (e.g., the risk of each goal).
r=risk free rate of return.
$P_0$=starting value of the portfolio
$P_k$=current value of the portfolio Equation (1) is an exemplary allocation algorithm that is based on the risk-return characteristic of the investment style of each goal. In particular, Equation (1) assigns the funding level to the goal as the difference between the sum of the starting value of the portfolio and the risk free rate of return and current portfolio value, allocated in proportion to the funding of each goal and the beta of each goal. The "$\Sigma_i (b_i \times a_i)$" is the sum over all i of all "$(b_i \times a_i)$". In one embodiment, a special case exists when each of the targets has a zero beta, such that the "$\Sigma_i (b_i \times a_i)$" is undefined. In this case, the allocation for each goal i at time k =$[a_i \times P_0]$ +$[(a_i \times P_0) \times ((1+r)^k)]$, where "$[a_i \times P_0]$" is the starting value and "$[(a_i \times P_0) \times ((1+r)^k)]$" is the risk free return. It is to be appreciated by those of ordinary skill in the art that Equation (1) is a simplified example and that adjustments would need to be made to prevent negative holdings, account for constraints and/or preferences, factor in U.S. Securities laws, etc.

At block 212, in one embodiment, process 200 updates the account-level target based on the updated funding levels. In one embodiment, the account-level target is updated by blending the goal-level targets together using a blending algorithm that utilizes an updated blend ratio to proportionally factor in the updated funding level of each goal (as determined by the allocation algorithm) to create an updated idealized weighted portfolio for the investor's goals as a whole. In this way, the updated account-level target can be seen as an updated master target for the investor's goals. The updated account-level target (as determined based on the updated blend ratio) would be used to guide the management of the investor's single account holistically, without subaccounts, in a way that allows for further modifications based on customization, constraints and/or preferences, tax management, etc. At block 214, process 200 allows alteration of the goal funding levels. In one embodiment, an investor or their advisor could add additional funds to a goal, remove funds from a goal, and/or move funds from one goal to another. If the goal funding levels are altered, process 200 can generate and implement a new portfolio target when an investor updates desired goal-level funding or targets, and/or generates and implements new portfolio target in response to system-generated changes in the allocation of portfolio value among goals. In one embodiment, if an investor changes selected funding levels, process 200 will alter the account-level target blend ratio that was created in the first place. If there are changes in the portfolio value, process 200 updates the allocation of funds to each goal and then updates the blend ratio of the account-level target. In one embodiment, the actual portfolio can be rebalanced (e.g., each of the securities re-determined) based on the updated account-level target that is determined using the one or more allocation algorithms. In this way, the actual portfolio being used by an investor to achieve GBI can be updated automatically to follow the updated account-level target based on updates to the account-level target after the allocation of the funding levels.

In one embodiment, process 200 generates, stores and optionally presents a goal report at block 216. In one embodiment, the goal report is stored in storage, such as storage 110 described above in connection with FIG. 1. In one embodiment, the updated funding levels for each goal that were determined by the allocation algorithm are used to create a report, which can be compared to a trend line for each goal. In this way, the investor can compare the updated funding levels for each of his goals at the time after the predetermined time period to the trend line for the corresponding goals. In this way, the investor or his advisor can track the progress of GBI, and make manual alterations to his actual portfolio if necessary. In an alternate embodiment, the goal report is presented on a local display or a client, such as local display 106 or client(s) 104. In one embodiment, a periodic value of a current funding level of the goal can be calculated and used to generate a periodic report, where the generation of the periodic report at least one of storing the periodic report in the persistent storage or presenting the periodic report. In a further embodiment, the periodic value of the current funding level is compared to a trend line of the goal to enable an investor to track his GBI progress.

Figure 3:
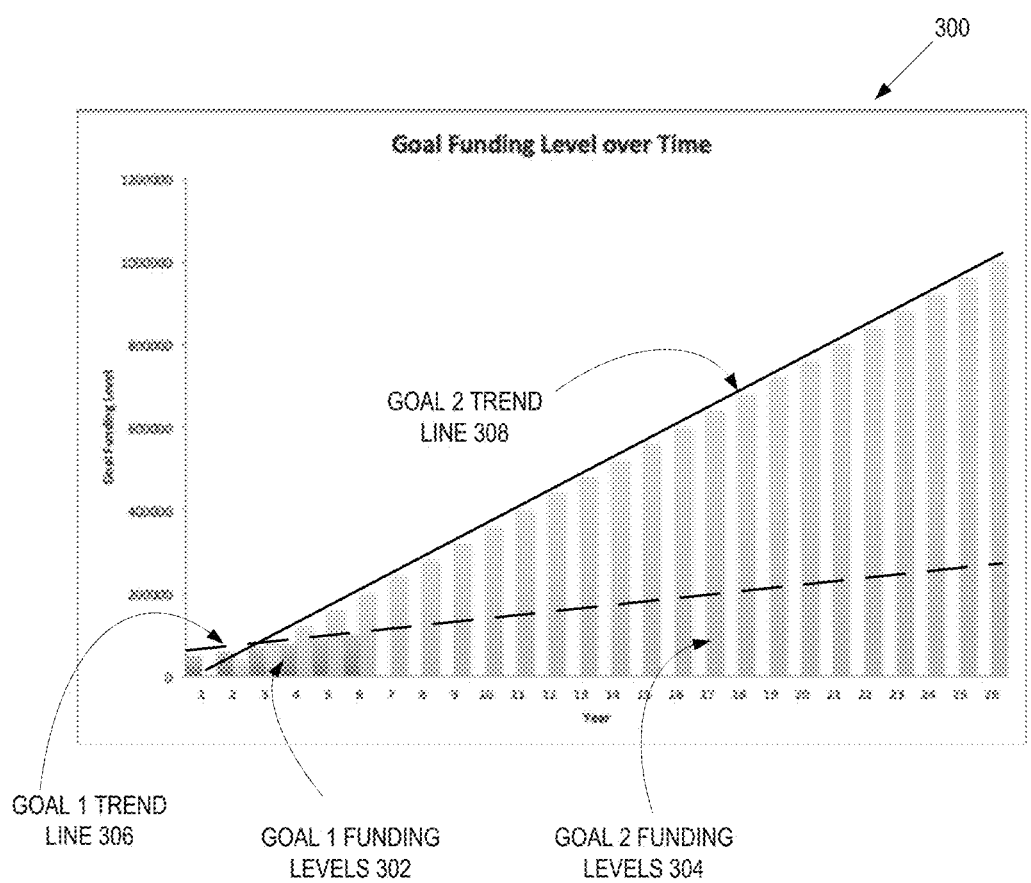
FIG. 3 is one embodiment of a chart illustrating a goal funding level over time.

FIG. 3 is a chart 300 of goal funding level over time. In FIG. 3, two goal trend lines are illustrated. Goal 1 trend line 306 is a trend line for goal 1 for funding levels 302. In one embodiment, goal 1 is a goal with a higher initial funding and with a slower accumulation of funds as embodied by the trend line with the relative flatter slope. Goal 2 trend line 308 is a trend line for goal 2 funding levels 304. Goal 2 represents a long-term goal that starts with a low initial funding and grows more rapidly than goal 1 over a long period of time. For example and in one embodiment, goal 1 can be a short-term goal such as accumulating $100,000 for a boat over five years, while goal 2 can be long-term goal such as accumulating $1 million over 25 years for retirement. In this example and embodiment, the funding level for each of goal is the amount of funding for the time needed to reach the trend line for that goal. For example and in one embodiment, the funding levels for goals 1 and 2 at year 4 would $80,000 and $120,000, respectively.

While in one embodiment, the trend lines are illustrated as being linear, in alternate embodiments, the trend lines can be different (e. g., non-linear, exponential, or another type of graph). Note that funding a goal up to its trend line is not the same as fully funding the goal. For example and in one embodiment, an investor with a $20,000 portfolio and an ability to save from future earnings has two goals, a price goal of retiring with $1 million in 25 years and secondary goal of buying a boat for $25,000 in 2 years. The investor initially funds the boat goal with $20,000. The trend line of the retirement goal therefore starts at $0—and even though retiring is the higher ranked goal, "funding to trend line" requires no initial allocation. The value of each goal's "account" would be a function of the value of the portfolio as a whole, each goal's place in the hierarchy, and its trend line (a function of its initial funding, the $ value of the goal and its time horizon). High ranked goals are more likely to be fully funded. In another embodiment, one or a few goals might be partially funded and the remaining goals would have zero funds initially. Alternatively, changes in the portfolio value are allocated according to the above algorithm. This alternative will dampen the volatility of the funding level of low ranked goals. In one embodiment of GBI using an account-level target, at least one of the allocation algorithm incorporates the trend line to determine updated funding levels for each of the investor's goals, as described below in FIG. 5.

Figure 4:
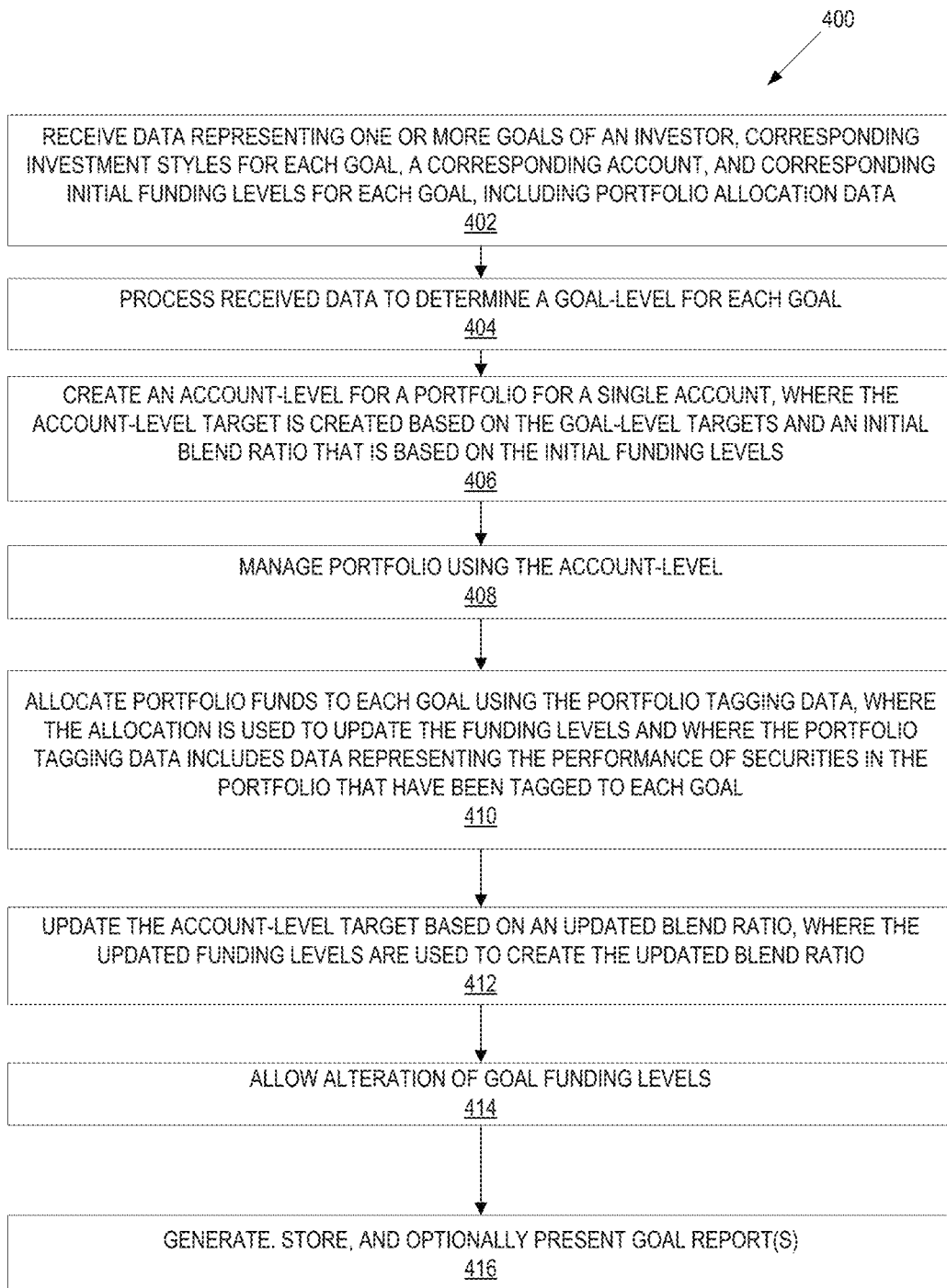
FIG. 4 is a flowchart of one embodiment of a process to perform GBI using an account-level target with and an algorithm that allocates portfolio value among the goals based on the performance of tagged portfolio holdings.

FIG. 4 is a flowchart of one embodiment of a process 400 to perform GBI using an account-level target and an algorithm that allocates portfolio value among goals based on the performance of tagged portfolio holdings. In one embodiment, process 400 is performed by a security-tagging allocation module 120 to perform GBI using a blended target and a portfolio-tagging goal-funding allocation algorithm, as described above in connection with FIG. 1.

In FIG. 4, process 400 begins by receiving data representing one or more goals of an investor, corresponding investment styles for each goal, a corresponding account, and corresponding initial funding levels for each goal, including portfolio tagging data at block 402. In one embodiment, the data is similar to or the same as the received data described above in FIG. 1. In addition, the data includes the portfolio tagging data, which refers to one or more returns of one or more securities in the purchased portfolio tagged to each goal. In one embodiment, the portfolio tagging data can be at least one of the holding weights of the securities in the actual portfolio, the relative weightings of goals, the weights of the securities in the associated targets, the current blend ratio, etc. At block 404, process 400 processes the received data to determine a goal-level target for each goal. In one embodiment, the processing of the received data to determine a goal-level target for each goal is performed as described above in FIG. 1. Process 400 creates an account-level target for the investor's portfolio block 406 using the initial blend ratio (as determined from the initial funding levels) and the goals' goal-level targets. In one embodiment, the account-level target is created from the goal-level targets using the initial blend ratio, as described above in FIG. 1.

At block 408, process 400 manages the actual portfolio using the account-level target. In one embodiment, process 400 manages the portfolio by making the actual portfolio minor the account-level target as closely as possible, while accounting for one or more constraints and/or preferences. By using an account-level target the portfolio is managed as a whole instead of having individual subaccounts that are managed separately. This can reduce the likelihood of occurrence of errors that is associated with using a traditional subaccounts approach to GBI.

At block 410, process 400 allocates the portfolio funds to each goal based on the performance of securities in the portfolio that have been tagged to each goal, as represented by the portfolio tagging data. In one embodiment, process 400 performs this allocation on a periodic time basis, such that the investor would have an indication as to the funding level for each goal. In one embodiment, process 400 allocates the portfolio funds by tagging the securities in the portfolio using a tagging algorithm that is a function of at least one of: (a) the weights of the holdings of each target; or (b) the relative weightings of each target in the blended target as described above. The funding level for each goal is then updated by the performance of the actual portfolio holdings that have been tagged to each respective goal. In one embodiment, if one or more of the securities in the actual portfolio cannot be tagged to a goal because the idealized portfolio lacks any securities that are similar to the untagged securities, then a covariance matrix can be used. In one embodiment, the covariance matrix searches for one or more similarities between the untagged securities in the actual portfolio and the idealized securities in the blended target. If a threshold number of similarities is satisfied, then the actual security can be tagged and allocated by the tagging algorithm. In one embodiment, the allocation algorithm could reduce the sum of the squares of the tracking errors of the blended targets, weighted by blend ratio. As another example and embodiment, if the portfolio contains 100 shares, 70 shares might be tagged to a retirement goal, while 30 shares might be tagged to a college fund goal. In a further embodiment, a risk model could be used for the tagging algorithm. The value of the portfolio as a whole would be allocated among the goals in proportion to the market value of that goal's tagged securities.

At block 412, in one embodiment, process 400 updates the account-level target based on the updated funding levels for each goal. In one embodiment, the account-level target is updated by blending the goal-level targets together using a blending algorithm that utilizes an updated blend ratio to proportionally factor in the updated funding level of each goal (as determined by the allocation algorithm) to create an updated account-level target for the investor's account and the investor's goals as a whole. In this way, the updated account-level target can be seen as an updated master target for the investor's goals. The updated account-level target (as determined based on the updated blend ratio) would be used to guide the management of the investor's single account holistically, without subaccounts, in a way that allows for further modifications based on customization, constraints and/or preferences, tax management, etc. At block 414, process 400 allows alteration of the goal funding levels. In one embodiment, an investor or their advisor could add additional funds to a goal, remove funds from a goal, and/or move funds from one goal to another. If the goal funding levels are altered, process 400 can generate and implement a new portfolio target when an investor update desired goal-level funding or targets, and/or generate and implement new portfolio target in response to system-generated changes in the allocation of portfolio value among goals. In one embodiment, if an investor changes selected funding levels, process 400 will alter the account-level target blend ratio that was created in the first place. If there are changes in the portfolio value, process 400 updates the allocation of funds to each goal and then updates the blend ratio of the account-level target. In one embodiment, the actual portfolio can be rebalanced (e.g., each of the securities re-determined) based on the updated account-level target that is determined using the one or more allocation algorithms. In this way, the actual portfolio being used by an investor to achieve GBI can be updated automatically based on updates to the account-level target after the allocation of the funding levels.

At block 416, process 400 generates, stores, and optionally presents a goal report at block 414. In one embodiment, the updated funding levels for each goal that were determined by the allocation algorithm are used to create a report, which can be compared to a trend line for each goal. In this way, the investor or his advisor can track the progress of GBI, and make manual alterations to his actual portfolio if necessary. In one embodiment, the goal report is stored in storage, such as storage 110 described above in connection with FIG. 1. In an alternate embodiment, the goal report is presented on a local display or a client, such as local display 106 or client(s) 104. In one embodiment, a periodic value of a current funding level of the goal can be calculated and used to generate a periodic report, where the generation of the periodic report at least one of storing the periodic report in the persistent storage or presenting the periodic report. In a further embodiment, the periodic value of the current funding level is compared to a trend line of the goal to enable an investor to track his GBI progress.

In one embodiment, the GBI device can also manage a portfolio for a plurality of goals using an account-level target and a goals hierarchy-based goal-funding allocation algorithm. In this embodiment, this device creates and updates a blended target proportionate to goal-level funding by allocating changes in portfolio value based on goal hierarchy.

Figure 5:
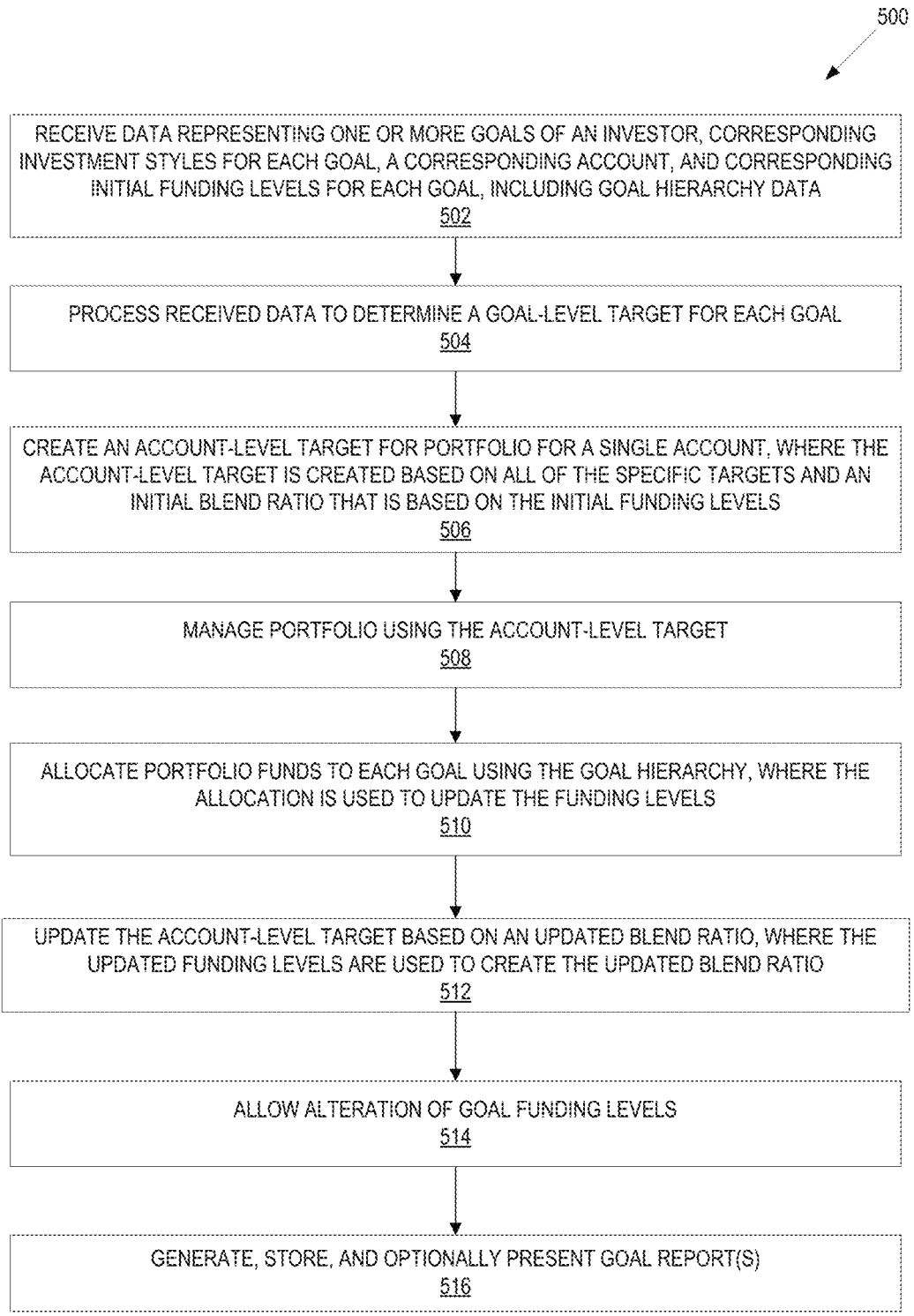
FIG. 5 is a flowchart of one embodiment of a process to perform GBI using an account-level target and an algorithm that allocates portfolio value among the goals based on a goal hierarchy.

FIG. 5 is a flowchart of one embodiment of a process 500 to perform GBI using a blended target and an algorithm that allocates portfolio value among the goals based on a goal hierarchy. In one embodiment, process 500 is performed by a hierarchical allocation module 122, as described above in connection with FIG. 1. In FIG. 5, process 500 begins by receiving data representing one or more goals of an investor, corresponding investment styles for each goal, a corresponding account, and corresponding initial funding levels for each goal, including goal hierarchy data at block 502. In one embodiment, the received data is as described above in FIG. 1. In addition, the received data includes goal hierarchy data, which ranks goals as being more, less, or of equal importance. The goal hierarchy data is used below to allocate funding for each goal. Higher goals will more likely be funded than lower goals.

At block 504, process 500 determines a goal-level target for each goal based on processing the received data. In one embodiment, a goal-level target is as described above in FIG. 1. Process 500 creates an account-level target at block 506. In one embodiment, the account-level target is created from the goals' goal-level targets by a blending algorithm that uses an initial blend ratio that is based on the initial funding levels. At block 508, process 500 manages the portfolio using the account-level target. For example and in one embodiment, process 500 manages the actual portfolio using a portfolio optimization program that minors the actual portfolio after the account-level target as closely as possible, while accounting for one or more constraints and/or preferences. By using an account-level target, the actual portfolio can be managed as a whole instead of having individual subaccounts that are managed separately. In this way, the operational complexity associated with using the traditional subaccounts approach can be reduced. For example and in one embodiment, performing GBI using an account-level target and an allocation algorithm that is based on goal hierarchy data can reduce the operational complexity associated with the traditional subaccounts approach to GBI by reducing the likelihood of errors that exist in the traditional approach, which in turn can enable one or more CPUs of the computers or computer systems executing instructions to perform GBI using a blended target to become more efficient by reducing the need for deploying additional computer resources to resolve those errors. The account-level target, therefore, can make some CPUs more efficient.

At block 510, process 500 allocates the portfolio funds to each goal using the goal hierarchy associated with each goal. In one embodiment, process 500 allocates the funding of each goal according to the goal hierarchy. In this embodiment, a higher goal will be funded to a desired funding level before a lower goal is funded. In one embodiment, the desired funding level for each goal is determined based on trend lines for each goal. In one embodiment, the relative ranking of goals to each other is based data that is provided by the investor and stored in storage 110 or a financial planning system that provides the data, via client(s) 104. Goals that are equal on the hierarchy will be funded pro rata. This allocation of funds continues until the funds are allocated. In one embodiment, process 500 performs this allocation on a periodic time basis such that the investor would have an indication as to the funding level for each goal. In one embodiment, if there are insufficient funds, preference is given to higher priority goals. Goals that have equal priority that cannot be fully funded should be funded pro rata. Excess funds should be allocated in order of priority such that higher priority goals would be satisfied with the reported probability of success, given the assumed distribution of returns. For example and in one embodiment, if the highest priority goal, e.g., retirement, is given a 70% probability of success, allocate sufficient excess funds to the retirement goal to support a 70% probability of success before allocating any excess funds to lower priority goals.

At block 512, in one embodiment, process 500 updates the account-level target based on the updated funding levels. In one embodiment, the account-level target is updated by blending the goal-level targets together using a blending algorithm that utilizes an updated blend ratio to proportionally factor in the updated funding level of each goal (as determined by the allocation algorithm) to create an updated idealized weighted portfolio for the investor's goals as a whole. In this way, the updated account-level target can be seen as an updated master target for the investor's goals. The updated account-level target (as determined based on the updated blend ratio) would be used to guide the management of the investor's single account holistically, without subaccounts, as a single account in a way that allows for further modifications based on customization, constraints and/or preferences, tax management, etc. At block 514, process 500 allows alteration of the goal funding levels. If the goal funding levels are altered, process 500 can generate and implement a new portfolio target when an investor updates desired goal-level funding or targets, and/or generates and implements a new portfolio target in response to system-generated changes in the allocation of portfolio value among goals. In one embodiment, if an investor changes selects funding levels, process 500 will alter the account-level target blend ratio that was created in the first place. If there are changes in the portfolio value, process 500 updates the allocation of funds to each goal and then updates the blend ratio of the account-level target, where the new blend ratio is proportionate to the updated goal funding levels. In one embodiment, an investor or their advisor could add additional funds to a goal, remove funds from a goal, and/or move funds from one goal to another. In one embodiment, the actual portfolio can be rebalanced (e.g., each of the securities re-determined) based on the updated account-level target that is determined using the one or more allocation algorithms. In this way, the actual portfolio being used by an investor to achieve GBI can be updated automatically to minor the updated account-level target based on updates to the account-level target after the allocation of the funding levels.

At block 516, process 500 generates, stores and optionally presents a goal report. In one embodiment, the goal report is stored in storage, such as storage 110 described above in connection with at least one of FIG. 1, 2, or 4. In an alternate embodiment, the goal report is presented on a local display or a client, such as a local display 106 or client(s) 104. In one embodiment, a periodic value of a current funding level of the goal can be calculated and used to generate a periodic report, where the generation of the periodic report at least one of storing the periodic report in the persistent storage or presenting the periodic report. In a further embodiment, the periodic value of the current funding level is compared to a trend line of the goal to enable an investor to track his GBI progress.

Investors can further manually alter the funding levels of a goal at any time. For example and in one embodiment, a GBI device can reverse the allocation algorithm above to calculate the probability of success that would result in this funding level, and this probability of success can be reported back to a planning system, which can use it to update the hierarchy of goals and the recommend holdings of the portfolio. The planning system can be a client 104 or part of a specialized computer system (not shown) for performing GBI. In one embodiment, the idea is that a financial planning system was running a portfolio optimization to maximize some sort of weighted joint probability of meeting the goals. In this embodiment, the GBI device can back out from a funding change an implicit change in desired probability of success, and can back out from that a change in implicit hierarchy, which should change the recommended portfolio.

Figure 6:
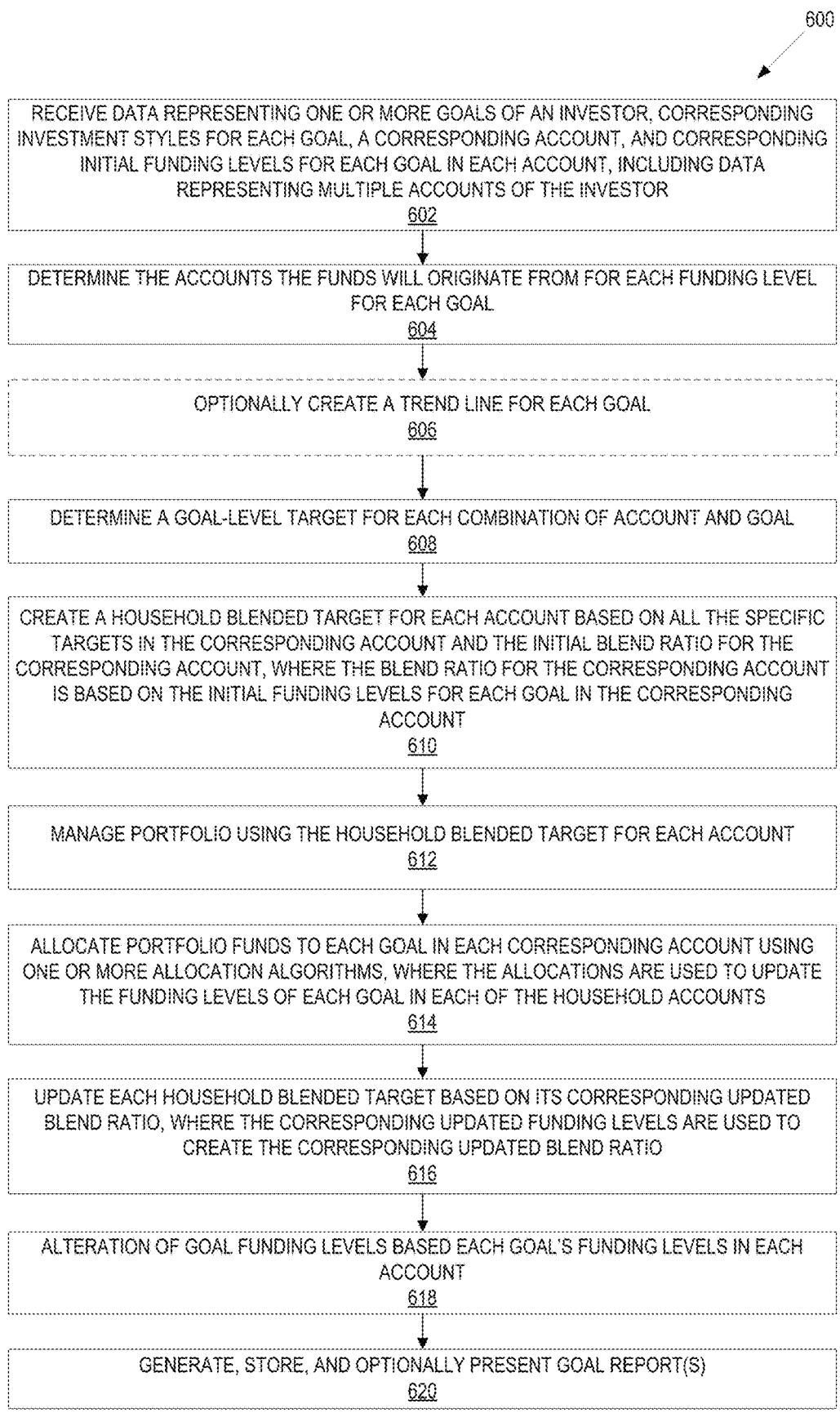
FIG. 6 is a flowchart of one embodiment of a process to perform GBI using at least two account-level targets for a single investor, where the single investor is engaged in GBI with multiple accounts.

FIG. 6 is a flowchart of one embodiment of a process 600 of performing a household GBI approach using at least two account-level targets. In one embodiment, process 600 is performed by household blended target 124 of GBI module 108, as described above in connection with FIG. 1. Process 600 begins, at block 602, by receiving data representing one or more goals of an investor, corresponding investment styles for each goal, multiple corresponding accounts, and corresponding initial funding levels for each goal from one or more of the multiple accounts, as described above in FIG. 1. The received data also includes including data representing multiple accounts of the investor. Data representing multiple accounts of the investor is described above in connection with FIG. 1.

For example and in one embodiment, a model family (hereinafter "the Smith Family") that has a portfolio being managed by a model investment bank (hereinafter "National Bank") has defined the following four goals:

Retirement: $175,000/year (after tax) starting in 2019 through 2046;
Gift to Carol: $250,000, if a second death in 2046 occurs;
Charity Donation: $375,000 in 2019; and,
Bequest: $100,000, if a second death in 2046 occurs.

At block 604, process 600 determines which account each funding level for each goal will originate from. In one embodiment, process 600 decides which securities in each account will be used to fund each goal based on one or more decisions of the single investor and/or his advisor. In one embodiment, process 600 automatically decides which securities in each account will be used to fund each goal without factoring one or more decisions of the single investor and/or his advisor.

In one embodiment, process 600 uses the characteristics of one or more accounts to determine which of the accounts will be used to fund the goals. For example and in one embodiment, the characteristics include the tax status of the account, the types of securities that can be purchased with the account without penalties, the resident of the account holder, etc. In one embodiment, the accounts include, but are not limited to, a pension, a superannuation, a retirement plan, and a joint taxable account (such as a checking account, etc.). In one embodiment, a retirement plan includes, but is not limited to, an Individual Retirement Account ("IRA"), a Simplified Employee Pension Individual Retirement Account ("IRA"), and other retirement plans as is known in the art.

In one embodiment, process 600 groups the single investor's accounts together and classifies each account according to its particular type and/or characteristics. For example and in one embodiment, the Smith Family has four accounts amounting to $1,709,000. In this example, process 600 groups the four accounts together and classifies each account based on its particular type and/or characteristics. In this example, process 600 classifies the four accounts as: (i) a 401K retirement savings account amounting to $375,000; (ii) an IRA amounting to $515,000; (iii) an IRA account amounting to $9,000; and, (iv) a joint taxable account (such as a checking account) that amounts to $506,000.

In one embodiment, process 600 determines which accounts will be used to fund the goals based on at least one of the corresponding investments styles to be used to achieve each goal, the tax statuses of each account, the time horizon of the goals, or the presence of penalties for early withdrawal from an account. For example and in one embodiment, process 600 determines the Smith Family accounts that will be used to fund each of the Smith Family's goals. In one embodiment, the determination of which accounts will be used is based on the choices made by the investor or his advisor. In one embodiment, these choices can be part of the data that is provided to process 600 at block 602. Table B, below, illustrates an example of how process 600 determines the Smith Family accounts that will be used to fund each of the Smith Family's goals.

TABLE B

An exemplary table illustrating how the accounts of the Smith Family and their corresponding tax statuses could be combined with the Smith Family's goals and investment objectives.

|  |  |  |  | Goals | | | | |
|---|---|---|---|---|---|---|---|---|
|  |  |  |  | Retirement | Gift to Carol | Charity Donation | Charitable Bequest | TOTAL |
|  |  |  |  | Objectives | | | | |
|  |  |  |  | Income | Balanced | Balanced | Aggressive Growth | By Account |
| Accounts | Alice's 401K | Type | NonTaxable | $375,000 | $0 | $0 | $0 | $375,000 |
|  | Bob's IRA |  | NonTaxable | $515,000 | $0 | $0 | $0 | $515,000 |
|  | Alice's IRA |  | NonTaxable | $9,000 | $0 | $0 | $0 | $9,000 |
|  | Joint Taxable Account |  | Taxable | $506,000 | $27,000 | $268,000 | $9,000 | $810,000 |
| TOTAL BY GOAL (= funding level for each goal) | | | | $1,405,000 | $27,000 | $268,000 | $9,000 | $1,709,000 |

Figure 9:
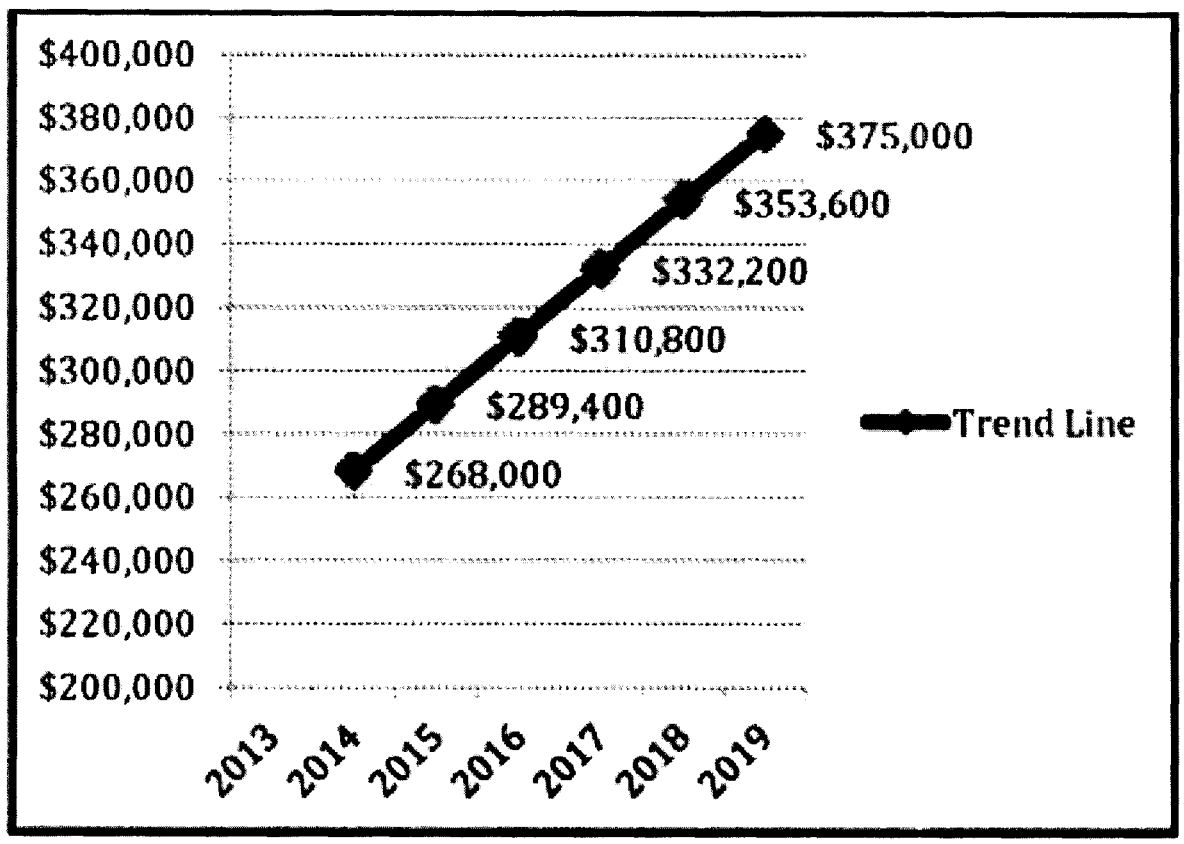
FIG. 9 is a chart showing an exemplary trend line for the Smith Family's "Charity Donation" goal.

At block 606, process 600 optionally creates a trend line for each goal. Trend lines are described above in FIG. 3. For example, and in one embodiment, a trend line for the "Charity Donation" goal of the Smith family is illustrated in FIG. 9.

At block 608, process 600 selects a goal-level target for each combination of account and goal. In one embodiment, process 600 selects a goal-level target for each combination of account and goal based on inputs provided by the single investor or his advisor. In one embodiment, process 600 selects a goal-level target by accounting for the investment styles, tax statuses of the accounts, or other costs associated with the accounts of each goal. For a simplified example, process 600 assigns as the goal-level target the "NonTaxable Tactical Income Target," "NonTaxable Tactical Balanced Target," "NonTaxable Tactical Aggressive Growth Target," "Taxable Tactical Income Target," "Taxable Tactical Balanced Target," or "Taxable Tactical Aggressive Growth Target." For another example, a combination of account and goal that has a NonTaxable account and an Income investment objective is assigned "NonTaxable Tactical Income Target." For example and in one embodiment, a combination of account and goal that has a NonTaxable account and a Balanced investment objective is assigned the "Nontaxable Tactical Balanced Target." For example and in one embodiment, a combination of account and goal that has a NonTaxable account and an Aggressive Growth investment objective is assigned the "Nontaxable Tactical Aggressive Growth Target." For example and in one embodiment, a combination of account and goal that has a taxable account and an Income investment objective is as assigned the "Taxable Tactical Income Target." For example and in one embodiment, a combination of account and goal that has a taxable account and a Balanced investment objective is assigned "Taxable Tactical Balanced Target." For example and in one embodiment, a combination of account and goal that has a taxable account and an Aggressive Growth investment objective is as assigned the "Taxable Tactical Aggressive Growth Target." For yet another example, the Smith Family's goal-level targets for each combination of its goals and accounts are provided in Table C, below.

TABLE C

An exemplary table illustrating the Smith Family's goal-level targets for each combination of the family's goals and accounts.

|  |  |  |  | Goals | | | | |
|---|---|---|---|---|---|---|---|---|
|  |  |  |  | Retirement | Gift to Carol | Charity Donation | Charitable Bequest | TOTAL |
|  |  |  |  | Objectives | | | | |
|  |  |  |  | Income | Balanced | Balanced | Aggressive Growth | By Account |
| Accounts | Alice's 401K | Type | NonTaxable | $375,000 NonTaxable Tactical Income Target | $0 | $0 | $0 | $375,000 |

TABLE C-continued

An exemplary table illustrating the Smith Family's goal-level targets for each combination of the family's goals and accounts.

| | | Retirement | Gift to Carol Objectives | Charity Donation | Charitable Bequest | TOTAL |
|---|---|---|---|---|---|---|
| | | Income | Balanced | Balanced | Aggressive Growth | By Account |
| Bob's IRA | NonTaxable | $515,000 NonTaxable Tactical Income Target | $0 | $0 | $0 | $515,000 |
| Alice's IRA | NonTaxable | $9,000 NonTaxable Tactical Income Target | $0 | $0 | $0 | $9,000 |
| Joint Taxable Account | Taxable | $506,000 Taxable Tactical Income Target | $27,000 Taxable Tactical Balanced Target | $268,000 Taxable Tactical Balanced Target | $9,000 Taxable Tactical Aggressive Growth Target | $810,000 |
| TOTAL BY GOAL (= funding level for each goal) | | $1,405,000 | $27,000 | $268,000 | $9,000 | $1,709,000 |

In one embodiment, process 600 selects a goal-level target for each combination of account and goal automatically. In this embodiment, the single investor or his advisor pre-fills a complete table of goal-level targets for every possible combination of investment objective and tax status. For example and in one embodiment, process 600 automatically selects the Smith Family's goal-level targets for each combination of its goals and accounts, based on a pre-filled table comprised of every possible combination of investment objective and tax status of each of the Smith Family's four accounts. Table D, below, provides an example of the pre-filled table.

TABLE D

An exemplary table illustrating a pre-filled table that shows a goal-level target for each combination of account and goal

| | Income | Balanced | Aggressive Growth |
|---|---|---|---|
| Non-taxable | Non-taxable Tactical Income Target | Non-taxable Tactical Balanced Target | Non-taxable Tactical Aggressive Growth Target |
| Taxable | Taxable Tactical Income Target | Taxable Tactical Balanced Target | Taxable Tactical Aggressive Growth Target |

At block 610, process 600 generates an account-level target for each account. In one embodiment, process 600 uses the initial funding level of each account to determine an initial blend ratio for each account, which is then used to calculate the respective account-level targets for each of the accounts using the goal-level targets of each account. In one embodiment, process 600 uses the initial blend ratio for each account to generate an account-level target for each of the corresponding accounts. For example and in one embodiment, process 600 calculates one or more blend ratios for each of the four accounts of the Smith Family, as shown below in

TABLE E

Figure 7:
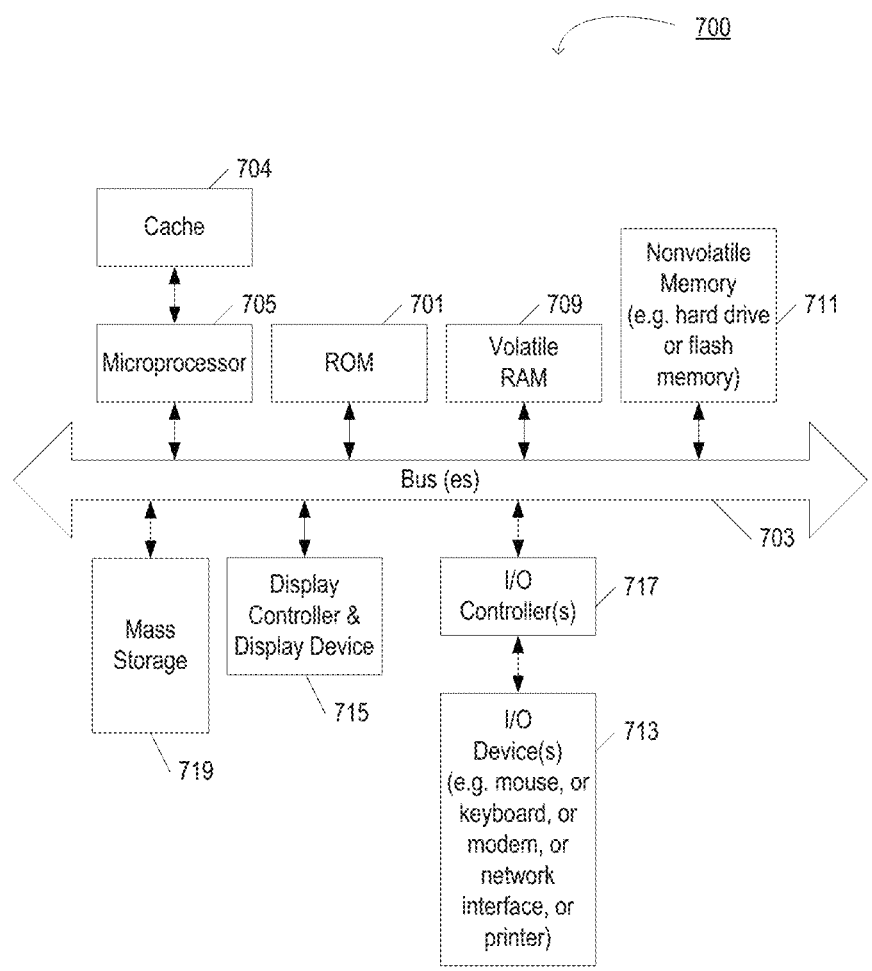
FIG. 7 illustrates an example of a typical computer system, which may be used in conjunction with the embodiments described herein.

An exemplary table illustrating the results of calculating one or more blend ratios by process 600 of FIG. 7.

| Accounts | Non-taxable Tactical Income Target | Taxable Tactical Income Target | Taxable Tactical Balanced | Taxable Tactical Aggressive | Taxable Tactical Balanced | TOTAL By Account |
|---|---|---|---|---|---|---|
| Alice's 401K | 100% | 0% | 0% | 0% | 0% | 100% |
| Bob's IRA | 100% | 0% | 0% | 0% | 0% | 100% |
| Alice's IRA | 100% | 0% | 0% | 0% | 0% | 100% |
| Joint Taxable Account | 0% | 62.47% | 3.33% | 33.09% | 1.11% | 100% |

In Table E, each of Alice's 401K, Bob's IRA, and Alice's IRA has a non-taxable tactical income target with a blend ratio of 100%. The Smith Family's joint taxable account, however, has a taxable tactical income target with a blend ratio of 62.47%, a taxable tactical balanced target with a blend ratio of 3.33%, a taxable tactical aggressive growth target with a blend ratio of 33.09, and a taxable tactical balanced target of 1.11%. In one embodiment, each target is associated with a one or more of the Smith Family's four goals.

In one embodiment, process 600 determines the blend ratios for constructing each account's account-level target based on the initial funding level for each goal in each account. Process 600 generates an account-level target for each account by combining one or more of an account's goal-level targets with a blend ratio determined by each goal's initial funding level in the account. For example and in one embodiment, the Smith Family's joint taxable account funds four different goals. In this example, the joint taxable account has four goal-level targets. In this example, process 600 generates an account-level target for the joint taxable account based on a combination of each of the four goal-level targets.

At block 612, process 600 manages the single investor's portfolio using each of the account-level target associated with a corresponding account of the single investor. By using an account-level target for each account, each account of the single investor's portfolio is managed as a whole instead of having individual subaccounts for each of those accounts that are managed separately. This allows for an overall management of the portfolio, which reduces complexity and avoids problems where one subaccount is managed in a way that is inconsistent with another subaccount for the single investor. For example and in one embodiment, management of one subaccount of one account may purchase one security and a management of another subaccount of another account may sell that same security. By managing the each actual account as a whole, such inconsistent management can be reduced, if not eliminated.

At block 614, in one embodiment, one or more allocation algorithms are applied to allocate the funding levels of each goal in each of the multiple accounts after a predetermined amount of time has elapsed. In one embodiment, the allocation algorithm includes at least one of the algorithms described above in connection with at least one of FIG. 1, 2, 4, or 5. In one embodiment, process 600 uses the allocation algorithm to allocate the actual portfolio's funds in each account to each goal. In one embodiment, the allocation algorithm results in an allocation of the portfolio funds on a periodic time basis such that the investor would have an indication as to the funding level for each goal.

At block 616, in one embodiment, process 600 updates each account's blend ratio based on the updated funding levels for each goal in each corresponding account. In one embodiment, each account-level target is updated by blending the corresponding goal-level targets together using a blending algorithm that utilizes an updated blend ratio to proportionally factor in the updated funding level of each goal in each corresponding account (as determined by the allocation algorithm) to create an updated idealized weighted portfolio for the investor's goals as a whole in each account. In this way, the updated account-level target for an account can be seen as an updated master target for the investor's goals in that account. The updated account-level target for each account (as determined based on the corresponding updated account's blend ratio) would be used to guide the management of each of the investor's accounts holistically, without subaccounts. Each account would be managed holistically as a single account using its corresponding updated account-level target in a way that allows for further modifications based on customization, constraints and/or preferences, tax management, etc. In one embodiment, the updated blend ratio for each account is determined based on the updated funding level for each goal in each account, as determined by the one or more allocation algorithms.

At block 618, in one embodiment, process 600 allows for the alteration of the goal funding levels based on the updated funding level of each goal. In this embodiment, the alteration of goals is not based on the total funds of the investor's accounts, just the funds of a particular account. Furthermore, as described above in at least one of FIGS. 1-5, the investor or his advisor can manually alter the funding levels in some embodiments. If one or more of the goals have not been achieved, process 600 can re-start the householding GBI approach. In one embodiment, process 600 can generate, store and present goal reports, as shown in block 620. Generating, storing, and presenting goal reports is described above in at least one of FIGS. 2-5. In one embodiment, the generated report adds up the funding levels for each goal using the accounts that fund the goal. In this way, an investor can keep track of his GBI for each goal, even though the GBI is performed using at least two account-level targets. In one embodiment, a periodic value of a current funding level of the goal can be calculated and used to generate a periodic report, where the generation of the periodic report at least one of storing the periodic report in the persistent storage or presenting the periodic report. In a further embodiment, the periodic value of the current funding level is compared to a trend line of the goal to enable an investor to track his GBI progress. In one embodiment, the actual portfolio of each account can be rebalanced (e.g., each of the securities re-determined) based on the corresponding updated account-level target that is determined using the one or more allocation algorithms. In this way, the actual portfolio of each account being used by an investor to achieve GBI can be updated automatically based on updates to the account-level target of each account after the allocation of the funding levels.

FIG. 7 shows one example of a data processing system 700, which may be used with one embodiment of the present invention. For example and in one embodiment, the system 700 may be implemented including a device 102 as described above in connection with FIG. 1. Note that while FIG. 7 illustrates various components of a computer system, it is not intended to represent any particular architecture or manner of interconnecting the components as such details are not germane to the present invention. It will also be appreciated that network computers and other data processing systems or other consumer electronic devices, which have fewer components or perhaps more components, may also be used with the present invention.

As shown in FIG. 7, the computer system 700, which is a form of a data processing system, includes a bus 803 which is coupled to a microprocessor(s) 705 and a ROM (Read Only Memory) 701 and volatile RAM 709 and a non-volatile memory 711. The microprocessor 705 may retrieve the instructions from the memories 701, 709, 711 and execute the instructions to perform operations described above. The bus 703 interconnects these various components together and also interconnects these components 705, 701, 709, and 711 to a display controller and display device 715 and to peripheral devices such as input/output (I/O) devices 713 which may be mice, keyboards, modems, network interfaces, printers and other devices which are well known in the art. Typically, the input/output devices 713 are coupled to the system through input/output controllers 717. The volatile RAM (Random Access Memory) 709 is typically implemented as dynamic RAM (DRAM), which requires power continually in order to refresh or maintain the data in the memory.

The mass storage 719 is typically a magnetic hard drive or a magnetic optical drive or an optical drive or a DVD RAM or a flash memory or other types of memory systems, which maintain data (e.g. large amounts of data) even after power is removed from the system. Typically, the mass storage 719 will also be a random access memory although this is not required. While FIG. 7 shows that the mass storage 719 is a local device coupled directly to the rest of the components in the data processing system, it will be appreciated that the present invention may utilize a non-volatile memory which is remote from the system, such as a network storage device which is coupled to the data processing system through a network interface such as a modem, an Ethernet interface or a wireless network. The bus 703 may include one or more buses connected to each other through various bridges, controllers and/or adapters as is well known in the art.

Figure 8:
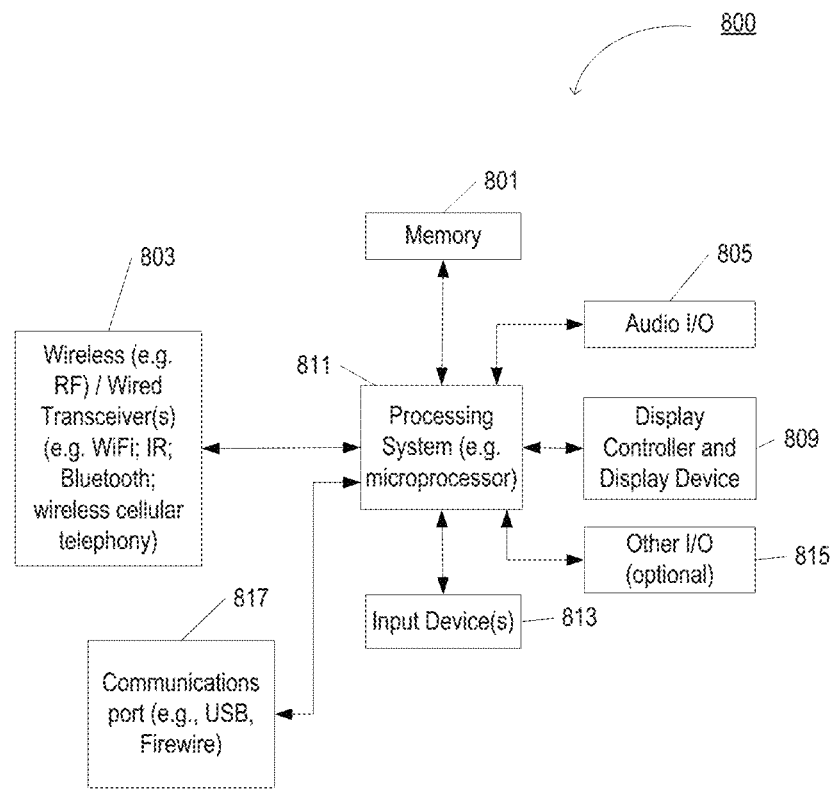
FIG. 8 is an example of a data processing system, which may be used with one embodiment of the present invention.

FIG. 8 shows an example of another data processing system 600 which may be used with one embodiment of the present invention. For example and in one embodiment, system 800 may be implemented as a device 102 as shown in FIG. 1. The data processing system 600 shown in FIG. 8 includes a processing system 811, which may be one or more microprocessors, or which may be a system on a chip integrated circuit, and the system also includes memory 801 for storing data and programs for execution by the processing system. The system 600 also includes an audio input/output subsystem 805, which may include a microphone and a speaker for, For example and in one embodiment, playing back music or providing telephone functionality through the speaker and microphone.

A display controller and display device 809 provide a visual user interface for the user; this digital interface may include a graphical user interface. The system 600 also includes one or more wireless transceivers 803 to communicate with another data processing system, such as the system 700 of FIG. 7. A wireless transceiver may be a WLAN transceiver, an infrared transceiver, a Bluetooth transceiver, and/or a wireless cellular telephony transceiver. It will be appreciated that additional components, not shown, may also be part of the system 600 in certain embodiments, and in certain embodiments fewer components than shown in FIG. 8 may also be used in a data processing system. The system 600 further includes one or more communications ports 817 to communicate with another data processing system, such as the system 700 of FIG. 7. The communications port may be a USB port, Firewire port, Bluetooth interface, etc.

The data processing system 600 also includes one or more input devices 813, which are provided to allow a user to provide input to the system. These input devices may be a keypad or a keyboard or a touch panel or a multi touch panel. The data processing system 600 also includes an optional input/output device 815 which may be a connector for a dock. It will be appreciated that one or more buses, not shown, may be used to interconnect the various components as is well known in the art. The data processing system shown in FIG. 8 may be a handheld computer or a personal digital assistant (PDA), or a cellular telephone with PDA like functionality, or a handheld computer which includes a cellular telephone, or a media player, or devices which combine aspects or functions of these devices, such as a media player combined with a PDA and a cellular telephone in one device or an embedded device or other consumer electronic devices. In other embodiments, the data processing system 600 may be a network computer or an embedded processing device within another device, or other types of data processing systems, which have fewer components or perhaps more components than that shown in FIG. 8.

Portions of what was described above may be implemented with logic circuitry such as a dedicated logic circuit or with a microcontroller or other form of processing core that executes program code instructions. Thus processes taught by the discussion above may be performed with program code such as machine-executable instructions that cause a machine that executes these instructions to perform certain functions. In this context, a "machine" may be a machine that converts intermediate form (or "abstract") instructions into processor specific instructions (e.g., an abstract execution environment such as a "virtual machine" (e.g., a Java Virtual Machine), an interpreter, a Common Language Runtime, a high-level language virtual machine, etc.), and/or, electronic circuitry disposed on a semiconductor chip (e.g., "logic circuitry" implemented with transistors) designed to execute instructions such as a general-purpose processor and/or a special-purpose processor. Processes taught by the discussion above may also be performed by (in the alternative to a machine or in combination with a machine) electronic circuitry designed to perform the processes (or a portion thereof) without the execution of program code.

The inventive concepts described herein also relate to an apparatus for performing the operations described herein. This apparatus may be specially constructed for the required purpose, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), RAMs, EPROMs, EEPROMs, magnetic or optical cards, or any type of media suitable for storing electronic instructions, and each coupled to a computer system bus.

A machine readable medium includes any mechanism for storing or transmitting information in a form readable by a machine (e.g., a computer). For example and in one embodiment, a machine readable medium includes read only memory ("ROM"); random access memory ("RAM"); magnetic disk storage media; optical storage media; flash memory devices; etc.

An article of manufacture may be used to store program code. An article of manufacture that stores program code may be embodied as, but is not limited to, one or more memories (e.g., one or more flash memories, random access memories (static, dynamic or other)), optical disks, CD-ROMs, DVD ROMs, EPROMs, EEPROMs, magnetic or optical cards or other type of machine-readable media suitable for storing electronic instructions. Program code may also be downloaded from a remote computer (e.g., a server) to a requesting computer (e.g., a client) by way of data signals embodied in a propagation medium (e.g., via a communication link (e.g., a network connection)).

The preceding detailed descriptions are presented in terms of algorithms and symbolic representations of operations on data bits within a computer memory. These algorithmic descriptions and representations are the tools used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be kept in mind, however, that these and similar terms are to be associated with the appropriate physical quantities and are merely convenient labels applied to these quantities. Unless specifically stated otherwise as apparent from the above discussion, it is appreciated that throughout the description, discussions utilizing terms such as "computing," "assigning," "determining," "sending," "managing," "storing," "saving," "allocating," "receiving," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The processes and displays presented herein are not inherently related to any particular computer or other apparatus. Various general-purpose systems may be used with programs in accordance with the teachings herein, or it may prove convenient to construct a more specialized apparatus to perform the operations described. The required structure for a variety of these systems will be evident from the description below. In addition, the present invention is not described with reference to any particular programming language. It will be appreciated that a variety of programming languages may be used to implement the teachings of the invention as described herein.

The foregoing discussion merely describes some exemplary embodiments of the present invention. One skilled in the art will readily recognize from such discussion, the accompanying drawings and the claims that various modifications can be made without departing from the spirit and scope of the invention.

What is claimed is:

1. A non-transitory machine-readable medium having executable instructions to cause one or more processing units to perform a method to perform computer- implemented goals-based investing, the method comprising:
receiving data representing a plurality of goals of an investor, an investment style for each of the plurality of goals, an account for funding the plurality of goals, and initial funding levels for each of the plurality of goals to create a goal-level target for each of the plurality of goals;
creating a blended account-level target based on each goal-level target and an initial blend ratio, the initial blend ratio being formed from the one or more processing unit's execution of a blending algorithm proportionally factoring in the initial funding levels for each of the plurality of goals to create the blended account-level target for an overall goal, wherein the blended account-level target represents an idealized portfolio of the investor;
storing a computer-implemented purchased portfolio undivided in a single memory location;
maintaining the computer-implemented purchased portfolio as an undivided account
wherein utilizing the undivided account enables using fractional shares for one or more of the plurality of goals while preventing errors and excess costs caused by fractional share trading, reducing operational complexity of the one or more processing units as the number of plurality of goals increases when managing the computer implemented purchased portfolio, the computer-implemented purchased portfolio representing the plurality of goals and initial funding levels;
managing the computer-implemented purchased portfolio using the blended account- level target for the overall goal; and
allocating funds of the computer-implemented purchased portfolio to the plurality of goals within the undivided account, the allocated funds being used to update funding levels for each goal, by using a risk-return characteristic that is associated with the investment style of each goal, the updated funding levels being used for determining the updated blend ratios of the blended account-level target.

2. The non-transitory machine-readable medium of claim 1, wherein the method further comprises:
updating the blended account-level target based on an updated blend ratio, the updated blend ratio being formed from the updated funding levels for each goal;
generating a report of the updated funding levels; and
storing the report in persistent storage.

3. The non-transitory machine-readable medium of claim 1, wherein:
the data includes at least one of a risk-return characteristic of each goal's assigned investment style, a current trend line value for each goal, a change in the computer-implemented purchased portfolio value after a predetermined amount of time, one or more characteristics of securities in the computer-implemented purchased portfolio, a covariance matrix, portfolio tagging data, or goal hierarchy data;

the portfolio tagging data refers to one or more returns of securities in the computer- implemented purchased portfolio tagged to each goal; and the goal hierarchy data refers to a hierarchy of goals determined based on the relative priority of each goal to the investor.

4. The non-transitory machine-readable medium of claim 3, wherein the allocating of the funds is based on at least one of:
the risk-return characteristic of each goal's assigned investment style;
the portfolio tagging data; or
the goal hierarchy data.

5. The non-transitory machine-readable medium of claim 4, wherein the allocating of the funds based on the portfolio tagging data includes using the covariance matrix to tag at least one of the securities in the computer-implemented purchased portfolio to a goal.

6. A non-transitory machine-readable medium having executable instructions to cause one or more processing units to perform a method to perform computer-implemented goals-based investing of a household, the household being made up of a plurality of accounts that belong to an investor, and the method comprising:
storing a plurality of computer-implemented purchased portfolios, each computer implemented purchased portfolio representing a single account stored undivided in a single memory location;
creating a blended account-level target for each of the plurality of accounts using a plurality of goals for these plurality of accounts, wherein each blended account-level target represents one of a plurality of idealized portfolios of the investor;
storing the blended account-level target in a persistent storage;
managing each of the plurality of computer-implemented purchased portfolios undivided within a single account in the single memory location, based on a corresponding one of the blended account-level targets, wherein managing the plurality of computer-implemented purchased portfolios undivided enables using fractional shares for one or more of the plurality of goals while preventing errors and excess costs caused by fractional share trading, reducing operational complexity of the one or more processing units as the number of plurality of goals increases when managing the computer-implemented purchased portfolio, the computer-implemented purchased portfolio representing the plurality of goals and initial funding levels;
maintaining the stored blended account-level target, the stored blended account-level target being used to guide the managing of the plurality of computer-implemented purchased portfolios of the investors; and
allocating funds of each of the plurality of computer-implemented purchased portfolios to the plurality of goals, the allocated funds being used to update funding levels for each goal, by using a risk-return characteristic that is associated with the investment style of each goal, the updated funding levels being used to update the blend ratio of the blended account-level targets.

7. The non-transitory machine-readable medium of claim 6, wherein the investor is at least one of:
an individual;
a group of individuals with at least one correlating characteristic; or
a non-natural entity.

8. The non-transitory machine-readable medium of claim 6, wherein the creating the blended account-level target for each account comprises:
receiving data representing a plurality of goals, an investment style for each of the plurality of goals, multiple accounts for funding the plurality of goals, initial funding levels for each of the plurality of goals in each account, one or more characteristics of each account, and multiple accounts of the investor;
determine a goal-level target for each one of the plurality of goals in each account, wherein the goal-level target is selected based on the initial funding level for the goal in each account, the investment style for the goal in each account, the one or more characteristics of each account, and one or more of the multiple accounts for funding the goal; and
creating the blended account-level target for each account, the blended account-level target being generated by processing the goal-level targets in a corresponding account with an initial blend ratio that is determined from the initial funding levels for each goal in the corresponding account.

9. The non-transitory machine-readable medium of claim 8, wherein the one or more accounts used to fund each goal are chosen at the security level.

10. The non-transitory machine-readable medium of claim 6, wherein the maintaining the stored blended account-level target for each account comprises:
calculating a periodic value of a current funding level of one of the goals for each account; using the updated funding levels to calculate new blend ratios for the blended account- level target;
updating the stored blended account-level target for each account;
rebalancing the computer-implemented purchased portfolio;
generating a periodic report based on the periodic value, wherein the generating the periodic report based on the periodic value comprises at least one of storing the periodic report in the persistent storage or presenting the periodic report; and
comparing the periodic value of the current funding level to a trend line of the goal.

11. A computer-implemented method to perform computer-implemented goals-based investing using a blended target, the method comprising:
receiving data representing a plurality of goals of an investor, an investment style for each of the plurality of goals, an account for funding the plurality of goals, and initial funding levels for each of the plurality of goals to create a goal-level target for each of the plurality of goals;
creating, with a goals-based investing device, a bended account-level target based on each goal-level target and an initial blend ratio, the initial blend ratio being formed from the initial funding levels, wherein the blended account-level target represents an idealized portfolio of the investor;
managing a computer-implemented purchased portfolio in a single account, undivided within a single memory location, using the blended account-level target, wherein the managing includes mirroring the computer-implemented purchased portfolio of the investor after the idealized portfolio in the blended account-level target while taking one or more constraints and/or preferences of the investor into account, wherein utilizing the single account, undivided within the single memory location, enables using fractional shares for one or more of the plurality of goals while preventing errors and excess costs caused by fractional share trading, reducing operational complexity of the one or more processing units as the number of plurality of goals increases when managing the computer-implemented purchased portfolio, the computer-implemented purchased portfolio representing the plurality of goals and initial funding levels; and allocating funds of the computer-implemented purchased portfolio to the plurality of goals, the allocated funds being used to update funding levels for each goal, by using a risk-return characteristic that is associated with the investment style of each goal, the updated funding levels being used for determining the updated blend ratios of the blended account-level target.

12. The computer-implemented method of claim 11, wherein the method further comprises:
updating the blended account-level target based on an updated blend ratio, the updated blend ratio being formed from the updated funding levels for each goal;
generating a report of the updated funding levels; and
storing the report in persistent storage.

13. The computer-implemented method of claim 11, wherein:
the data includes at least one of a risk-return characteristic of each goal's assigned investment style, a current trend line value for each goal, a change in the computer-implemented purchased portfolio value after a predetermined amount of time, one or more characteristics of securities in the computer-implemented purchased portfolio, a covariance matrix, portfolio tagging data, or goal hierarchy data;
the portfolio tagging data refers to one or more returns of securities in the computer-implemented purchased portfolio tagged to each goal; and
the goal hierarchy data refers to a hierarchy of goals determined based on the relative priority of each goal to the investor.

14. The computer-implemented method of claim 13, wherein the allocating of the funds is based on at least one of:
the risk-return characteristic of each goal's assigned investment style;
the portfolio tagging data; or
the goal hierarchy data.

15. The computer-implemented method of claim 14, wherein the allocating of the funds based on the portfolio tagging data includes using the covariance matrix to tag at least one of the securities in the computer-implemented purchased portfolio to a goal.

16. A computer system including a device to perform computer-implemented goals-based investing using a plurality of blended account-level targets, the system comprising:
at least one computer including the device, wherein the computer is a specialized computer that is configured to perform goals-based investing using the plurality of blended account-level targets by:

a memory to store a computer-implemented purchased portfolio, in a single account, undivided in a single memory location;
a processor creating the plurality of blended account-level targets for a plurality of accounts using a plurality of goals for the plurality of accounts, wherein each blended account-level target corresponds to one of the plurality of accounts, wherein each blended account-level target represents one of a plurality of idealized portfolios of the investor;
the memory to store the blended account-level target for each account in a persistent storage;
the processor maintaining the computer-implemented purchased portfolio as an undivided account, wherein maintaining the undivided account enables using fractional shares for one or more of the plurality goals while preventing errors and excess costs caused by fractional share trading, reducing operational complexity of the computer as the number of the plurality of goals increases when managing the computer-implemented purchased portfolio;
the processor enabling managing the computer-implemented purchased portfolio undivided within the single memory location, based on a corresponding one of the blended account-level targets;
maintaining the stored blended account-level targets, the stored blended account-level target being used to guide the managing of the plurality of computer-implemented purchased portfolios of the investors; and
allocating funds of each of the plurality of computer-implemented purchased portfolios to the plurality of goals, the allocated funds being used to update funding levels for each goal, by using a risk-return characteristic that is associated with the investment style of each goal, the updated funding levels being used to update the blend ratios of the blended account-level target.

17. The system of claim 16, wherein the specialized computer is configured to create the blended account-level target for each account by:
receiving data representing a plurality of goals, an investment style for each of the plurality of goals, multiple accounts for funding the plurality of goals, initial funding levels for each of the plurality of goals in each account, one or more characteristics of each account, and multiple accounts of the investor;
determine a goal-level target for each one of the plurality of goals in each account, wherein the goal-level target is selected based on the initial funding level for the goal in each account, the investment style for the goal in each account, one or more characteristics of each account, and one or more of the multiple accounts for funding the goal; and
creating the blended account-level target for each account, the blended account-level target for each account being generated by processing the goal-level targets in a corresponding account with an initial blend ratio that is determined from the initial funding levels for each goal in the corresponding account.

18. The system of claim 16, wherein the specialized computer is configured to maintain the stored blended account-level targets by:
calculating a periodic value of a current funding level of one of the goals;
using the updated funding levels to update the blend ratio of the blended account-level target;

updating the stored blended account-level targets;
rebalancing the computer-implemented purchased portfolio;
generating a periodic report based on the periodic value, wherein the generating the periodic report based on the periodic value comprises at least one of storing the periodic report in the persistent storage or presenting the periodic report; and
comparing the periodic value of the current funding level to a trend line of the goal.

19. The system of claim 16, wherein the managing the computer-implemented purchased portfolio of the investor using the blended account-level targets comprises:
mirroring the computer-implemented purchased portfolio of each account after the blended account-level target for each account while factoring in one or more constraints and/or preferences of the investor.

20. The system of claim 16, wherein the at least one computer is in communication with a financial planning system, the financial planning system providing the at least one computer with data to perform the creating, the storing, the managing, and the maintaining.

* * * * *